(12) United States Patent
Puig

(10) Patent No.: US 8,873,026 B2
(45) Date of Patent: Oct. 28, 2014

(54) PROXIMITY SENSOR DISTANCE DETECTION AMBIGUITY REMOVAL

(75) Inventor: Carlos M. Puig, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 13/288,464

(22) Filed: Nov. 3, 2011

(65) Prior Publication Data

US 2013/0033694 A1 Feb. 7, 2013

Related U.S. Application Data

(60) Provisional application No. 61/515,820, filed on Aug. 5, 2011.

(51) Int. Cl.
| | |
|---|---|
| G01C 3/08 | (2006.01) |
| G01S 17/02 | (2006.01) |
| G01S 17/50 | (2006.01) |
| G01S 17/46 | (2006.01) |

(52) U.S. Cl.
CPC ............. *G01S 17/02* (2013.01); *G01S 17/50* (2013.01); *G01S 17/46* (2013.01)
USPC ......... 356/4.01; 356/3.01; 356/4.1; 356/5.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,408,288 A | * | 10/1983 | Kondo et al. ................. 382/106 |
| 5,715,042 A | * | 2/1998 | Milani et al. ................. 356/3.12 |
| 6,703,599 B1 | | 3/2004 | Casebolt et al. |
| 7,486,386 B1 | | 2/2009 | Holcombe et al. |
| 7,855,718 B2 | | 12/2010 | Westerman |
| 2004/0234107 A1 | | 11/2004 | Machida et al. |
| 2008/0012835 A1 | | 1/2008 | Rimon et al. |
| 2010/0167783 A1 | | 7/2010 | Alameh et al. |
| 2010/0295781 A1 | * | 11/2010 | Alameh et al. ................ 345/158 |
| 2011/0019205 A1 | | 1/2011 | Gerber et al. |

FOREIGN PATENT DOCUMENTS

| | | |
|---|---|---|
| DE | 10241810 A1 | 3/2004 |
| WO | 0154277 A1 | 7/2001 |
| WO | 03030363 A2 | 4/2003 |

OTHER PUBLICATIONS

Hinckley, et al., "Sensing Techniques for Mobile Interaction," ACM UIST 2000, Symposium on User Interface Software and Technology, CHI Letters 2 (2), pp. 91-100.

Intersil, ISL29011, Digital Ambient Light Sensor and Proximity Sensor with Interrupt Function, Datasheet, FN6467.3, Feb. 4, 2010, pp. 1-16.

International Search Report and Written Opinion—PCT/US2012/049348—ISA/EPO—Oct. 19, 2012.

* cited by examiner

*Primary Examiner* — Luke Ratcliffe

(74) *Attorney, Agent, or Firm* — Kilpatrick Townsend & Stockton LLP

(57) ABSTRACT

Example methods, apparatuses, or articles of manufacture are disclosed herein that may be utilized, in whole or in part, to facilitate or support one or more operations or techniques for proximity sensor distance detection ambiguity removal.

38 Claims, 11 Drawing Sheets

PROXIMITY SENSOR DISTANCE DETECTION AMBIGUITY REMOVAL

CROSS-REFERENCE TO RELATED APPLICATIONS

The present application claims priority to U.S. Provisional Patent Application Ser. No. 61/515,820, entitled "PROXIMITY SENSOR DISTANCE DETECTION AMBIGUITY REMOVAL," filed on Aug. 5, 2011, which is assigned to the assignee hereof and which is expressly incorporated herein by reference.

BACKGROUND

1. Field

The present disclosure relates generally to processing of sensor information for use with mobile communication devices and, more particularly, to proximity sensor distance ambiguity removal techniques for use in or with mobile communication devices.

2. Information

Mobile communication devices, such as, for example, cellular telephones, portable navigation units, laptop computers, personal digital assistants, or the like are becoming more common every day. These devices may include, for example, a variety of sensors to support a number of host applications. Typically, although not necessarily, sensors are capable of converting physical phenomena into analog or digital signals and may be integrated into (e.g., built-in, etc.) or otherwise supported by (e.g., stand-alone, etc.) a mobile communication device. For example, a mobile communication device may feature one or more accelerometers, gyroscopes, magnetometers, ambient light detectors, proximity sensors, thermometers, barometric pressure sensors, etc., capable of measuring various motion states, locations, orientations, ambient environments, etc. of the mobile device. Sensors may be utilized individually or may be used in combination with other sensors, depending on an application. Obtaining or providing more accurate or useful sensor measurements may, for example, improve or enhance performance of applications hosted on a mobile communication device. In addition, effective or efficient sensing techniques may reduce power consumption of mobile communication devices having limited power resources (e.g., battery-operated, etc.) and may positively affect operating lifetime of such devices. Accordingly, it may be desirable to develop one or more methods, systems, or apparatuses that may implement effective or efficient sensing techniques for a more satisfying user experience.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1A:
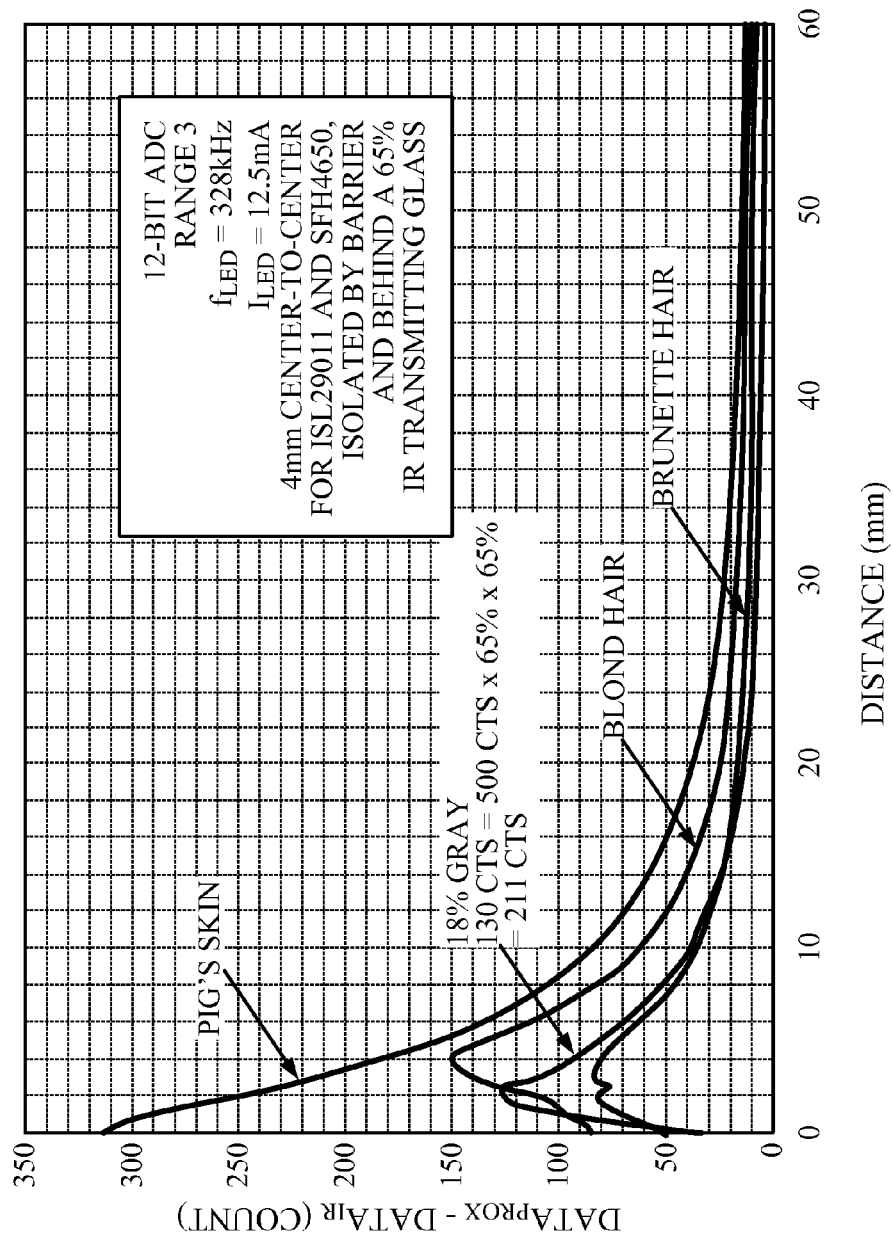
FIG. 1A is an implementation of an example plot illustrating proximity sensor response curves for various biological objects.

Example implementations relate to proximity sensor distance detection ambiguity removal. In one implementation, a method may comprise transmitting, at a mobile device, light from a sensor to a reflecting surface; receiving light reflected from the surface at the sensor; and determining whether a distance to the surface from the sensor has transitioned to a very near region or a far region based, at least in part, on a trend in an intensity of the received reflected light.

In another implementation, an apparatus may comprise a mobile device comprising a sensor to transmit light from the sensor to a reflecting surface, and receive light reflected from the surface at the sensor; and a processor to determine whether a distance to the surface from the sensor has transitioned to a very near region or a far region based, at least in part, on a trend in an intensity of the received reflected light.

In yet another implementation, an apparatus may comprise means for transmitting, at a mobile device, light from a sensor to a reflecting surface; means for receiving light reflected from the surface at the sensor; and means for determining whether a distance to the surface from the sensor has transitioned to a very near region or a far region based, at least in part, on a trend in an intensity of the received reflected light.

In yet another implementation, an article may comprise a non-transitory storage medium having instructions stored thereon executable by a special purpose computing platform at a mobile device to obtain at least one signal value representative of an intensity of light reflected from a reflecting surface to a sensor; and to determine whether a distance to the surface from the sensor has transitioned to a very near region or a far region based, at least in part, on a trend in the intensity of the received reflected light. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for proximity sensor distance detection ambiguity removal. As previously mentioned, a mobile communication device may comprise an ambient environment sensor, such as, for example, a proximity sensor or detector that may be utilized, at least in part, to sense or detect a presence of nearby objects, typically, although not necessarily, without physical contact. As used herein, "mobile device," "mobile communication device," "wireless device," "hand-held device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information over suitable communications networks according to one or more communication protocols. As a way of illustration, special purpose mobile communication devices, which may herein be called simply mobile devices, may include, for example, cellular telephones, satellite telephones, smart telephones, personal digital assistants (PDAs), laptop computers, personal entertainment systems, tablet personal computers (PC), personal audio or video devices, personal navigation devices, or the like. It should be appreciated, however, that these are merely illustrative examples of mobile devices that may be utilized to facilitate one or more processes or operations in connection with proximity sensor distance detection ambiguity removal, and that claimed subject matter is not limited in this regard.

In an implementation, a proximity sensor may, for example, be realized, at least in part, as an infrared (IR) emitter-receiver pair co-located or placed sufficiently closely on a mobile device, though claimed subject matter is not so limited. A proximity sensor may emit, such as via a light emitting diode (LED), for example, a beam of IR light towards a nearby object, and intensity or power of light reflected or scattered back from the object may be received or captured via an IR receiver. In some instances, reflected or scattered light may be converted into current or digitized in some manner to allow for a measurement activity, such as, for example, for measuring intensity or power of reflected or scattered light. Typically, although not necessarily, intensity or power of reflected or scattered light received at a proximity sensor changes according to a relative distance from a sensing or target object. Thus, at times, based, at least in part, on measured intensity or power of reflected or scattered light, a distance or proximity to such an object may, for example, be determined using appropriate techniques. A proximity sensor may be utilized for turning off or dimming a display or keypad of a mobile device to conserve battery power, for example, or deactivating a touch screen to avoid unwanted input if the device is brought near a user's face or ear during a call. Proximity sensors are known and need not be described here in greater detail. Proximity sensors may be available from a variety of manufacturers including, for example, Intersil Corp., Texas Advanced Optoelectronic Solutions, Inc., Avago Technologies Ltd, or the like.

As previously mentioned, proximity sensing typically depends on the amount of measured light reflected or scattered back from a surface of an object to be sensed or detected. For example, in some instances, measured light intensity may be expected to increase monotonically with distance as a reflecting surface of a target object gets closer to a proximity sensor. Unfortunately, because of object geometries, reflective properties of an associated surface, etc. as well as relative positioning of an IR emitter and IR receiver, measured light intensity or received reflected power is often not a monotonic function of distance. In certain simulations or experiments, it has been observed that some surfaces tend to show a peak response in output values at a certain distance to a target object, such as at 1-6 mm, for example, with a decline or so-called "reversal" in output values at smaller distances, such as below the peak's location. A decline or "reversal" in sensor output values may be observed or detected via a suitable response or performance curves plot, such as, for example, a plot of received power or proximity sensor analog-to-digital converter (ADC) count as a function of distance. By way of example but not limitation, some examples of response curves for proximity detections of various biological objects in connection with certain simulations or experiments, such as simulations or experiments using the Digital Ambient Light and Proximity Sensor ISL29011 available from Intersil Corp. of Milpitas, Calif., are illustrated in FIGS. 1A-1D. It should be appreciated that various measurements, parameters, readings, biological objects, etc., as well as behavior of response curves shown are merely examples to which claimed subject matter is not limited.

FIG. 1A is an implementation of an example plot of received reflected power as a function of distance illustrating example response curves for various biological objects generated or obtained by Intersil Corp. of Milpitas, Calif., in connection with certain simulations or experiments using the Digital Ambient Light and Proximity Sensor ISL29011. As seen, generally, as a distance from a proximity sensor to a reflecting surface decreases, there is first an increase in received reflected power until the power reaches a peak output value, such as, for example, at 1-6 mm. As previously mentioned, this evidences a decline or "reversal" in a sensor output values at relatively small distances. Further, as a distance to a reflecting surface of a target object decreases, for example, received reflected power typically begins to decrease. In other words, it may be observed that a particular measurement of received reflected power does not necessarily correspond to or coincide with a certain distance to a reflecting surface. For example, as seen, a particular measured output value of received reflected power may correspond to both a relatively smaller distance and a relatively larger distance, such as on opposing sides of a curve relative to a peak response. In an implementation, these relatively smaller and relatively larger or longer distances may, for example, be respectively referred to as a "very near region" or "very near zone" and a "far region" or "far zone." More specifically, if a reflecting surface is at distance that is somewhat shorter than a distance coincident with a peak response value, for example, the surface may be referred to as being in a very near region or zone. Likewise, if a reflecting surface is at a distance that is beyond a distance coincident with a peak response value, for example, the surface may be referred to as being in a far region or zone. It should be appreciated that in the context of the present disclosure, the terms "region" and "zone" may be used interchangeably. Particular examples of a very near region, far region, as well as near region will be described in greater detail below. As also illustrated, various biological objects or types of biological objects may have various reflecting properties. For example, an optically lighter biological object, such as blonde hair, is typically more reflective than an optically darker biological object, such as brunette hair. In addition, it may be observed that a particular type of a biological object, such as relatively lighter skin (e.g., pig's skin, etc.), for example, is more reflective than relatively darker hair, since IR light typically penetrates into skin and is reflected or scattered back from within. For example, it may be observed that a proximity count peaks at sensor contact and monotonically decreases as a distance between relatively lighter skin and a proximity sensor increases. Again, claimed subject matter is not limited to these particular examples.

Figure 1B:
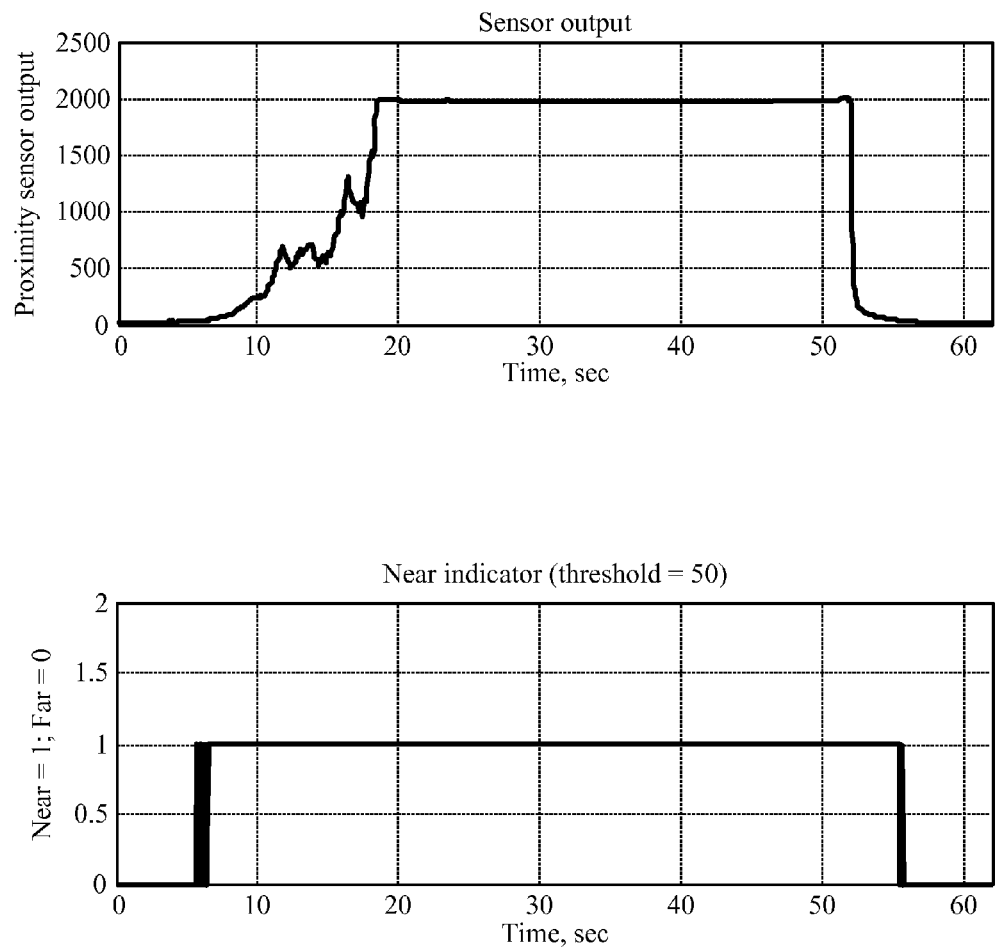
FIGS. 1B through 1D illustrate example proximity sensor responses for various reflective surfaces according to an implementation.
Figure 1C:
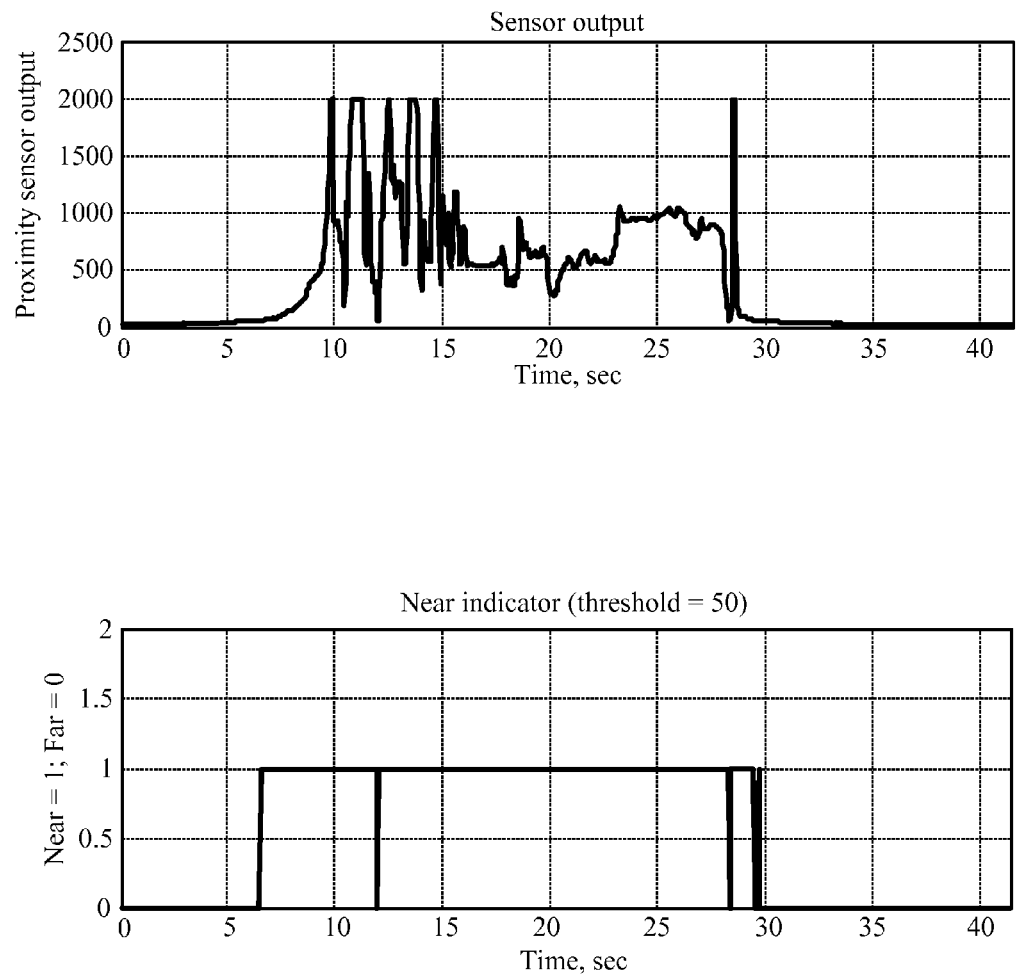
Figure 1D:
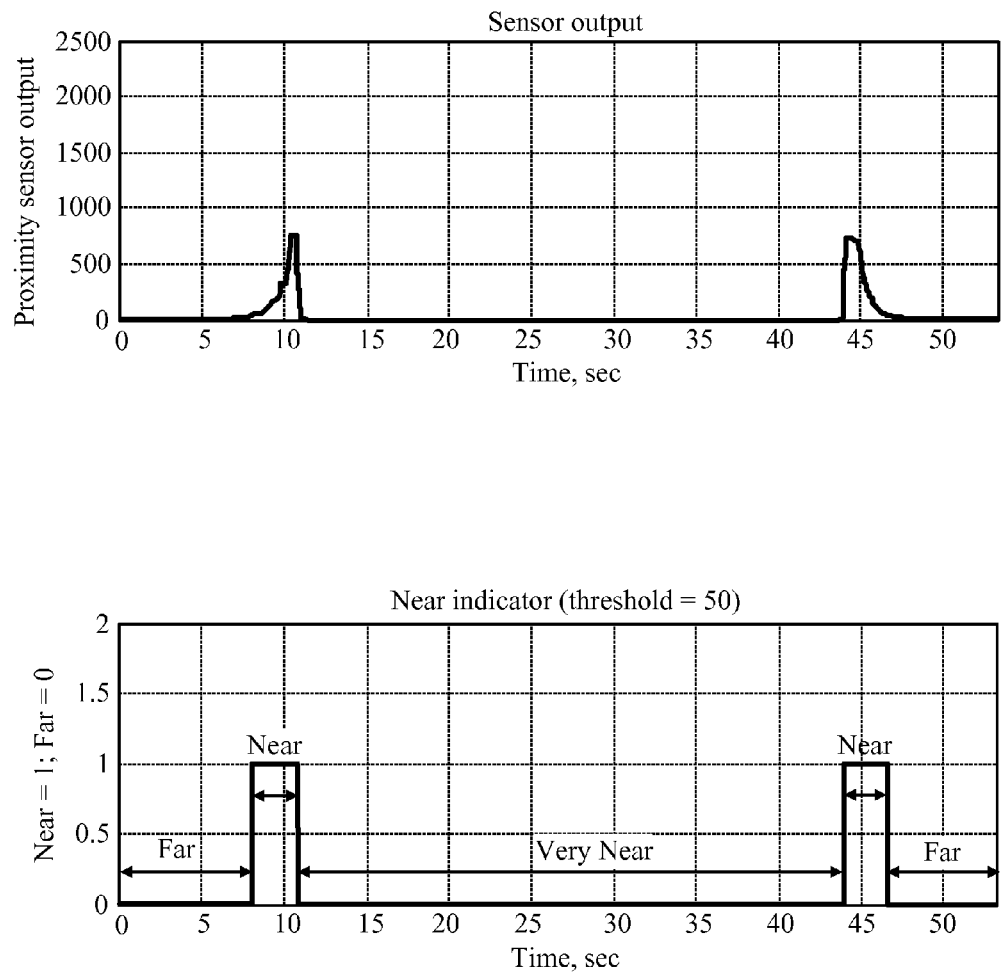

FIGS. 1B-1D further illustrate example proximity sensor responses for various reflective surfaces, such as a lighter surface (e.g., white, etc.), somewhat darker surface (e.g., gray, etc.), and relatively dark surface (e.g., black, etc.), respectively. For these examples, received reflected power was sampled over a time interval during which an IR proximity sensor was moved toward to and away from a reflecting surface.

Accordingly, proximity sensor values are shown with respect to time, rather than distance, though claimed subject matter is not so limited, of course. Any suitable proximity sensor response plot, such as a plot of received power as a function of distance discussed above, for example, may also be utilized or otherwise considered, in whole or in part. Here, a behavior of an example 'near' indicator function N(d) may, for example, be characterized or defined as:

$$N(d) = \begin{cases} 1, & \text{if surface is near} \\ 0, & \text{otherwise,} \end{cases}$$

where d denotes a distance from a proximity sensor to a reflecting surface of a target object. Based, at least in part, on a sensor reading A(d), N(d) may be computed, for example, as:

$$N(d) = \begin{cases} 1, & \text{if } A(d) \geq T \\ 0, & \text{otherwise,} \end{cases}$$

where T denotes some constant threshold value, which may be pre-defined (e.g., by a user, manufacturer, provider, etc.), for example, or otherwise dynamically defined in some manner, depending on an ambient environment, application, sensor, or the like. By way of example but not limitation, in one particular simulation or experiment, a 'near' indicator threshold of T=50 was used, though claimed subject matter is not limited in this respect. Thus, for example proximity sensor responses illustrated in FIGS. 1B-1D, respective upper plots are of received reflected power sampled over a time interval during which a surface is brought from a far region to touching a sensor, for example, and then returned to the far region. Respective lower plots are of a measured output signal in a binary format, such as a "Near=1/Far=0" bi-level format, for example, indicative of whether reflected power received at a proximity sensor, as shown in a corresponding upper plot, is below or above a certain threshold value T. In some implementations, a lower plot may be referred to as a "Near Indicator," for example, and may be used or otherwise considered, at least in part, to determine whether a sensor output value is sufficiently low or high, as will also be seen.

With respect to FIG. 1B, it may be observed that for a lighter surface, power or intensity of received reflected or scattered light is relatively great or otherwise sufficient for a measurement activity. For example, as seen in this example implementation, a proximity sensor reading A(d) saturates at a higher output value (e.g., at approximately 2,000) in a near region, which may be attributable, at least in part, to a particular sensor reaching the end of its measurement range. In other words, in some instances, certain variations in proximity sensor output values may not be observed (e.g., a top of a curve is somewhat flat, etc.), for example, due, at least in part, to a particular sensor configuration, which may, nevertheless, be sufficient for a measurement activity. Claimed subject matter is not so limited, of course.

FIG. 1C illustrates corresponding example results for a somewhat darker surface, such as a gray surface, for example, which produces relatively similar or otherwise sufficient proximity sensor responses. As seen, here, a near indicator N(d) may, at times, exhibit some noise fluctuations, which may be filtered out or otherwise attenuated in some manner using one or more appropriate techniques, such as, for example, via an application of a suitable hysteresis-type process, as described below. It should be appreciated that any suitable technique or process capable, for example, of increasing, improving, or otherwise affecting in a desired manner noise immunity may also be utilized.

FIG. 1D illustrates an example proximity sensor response to a relatively dark surface, which may include, for example, a black surface. Here, as may be observed, a response drops close to 0 if a reflecting surface of a target object is at a relatively small distance, such as in a very near region, for example, since very little or almost no light is typically reflected or scattered by the surface back to a proximity sensor. As also seen, unfortunately, a Near Indicator N(d) also signals that a proximity sensor is at a relatively large distance from a reflecting surface, such as, for example, in a far region (e.g., =0) while the sensor is actually in contact with the surface. Accordingly, in certain simulations or experiments, it has appeared that a threshold indicator-based proximity sensor may, for example, have difficulties distinguishing between relatively small and relatively large distances with respect to relatively dark or darker surfaces. As such, measuring or determining a distance to a relatively dark or darker surface of a target object via an application of thresholding logic alone, for example, may result in a higher rate of failure to detect proximity to the object if its surface is at a relatively small distance. In other words, in some instances, a threshold indicator-based proximity sensor may, for example, detect "far" if a target object is in fact in a very near region. As particularly seen in a lower plot, proximity sensor responses may, for example, be classified or characterized into three sensor-surface distance regions, though claimed subject matter is not limited in this regard. It should be noted that in some instances a very near region may not be present for certain surfaces, such as lighter surfaces, for example, but may typically, although not necessarily, be present for relatively dark or somewhat darker surfaces. Claimed subject matter, however, is not limited to this particular observation. Thus, consider:

A very near region, in which a measured proximity sensor response is below some threshold value T, and a sensor-surface distance is relatively small;

A near region, in which a measured proximity sensor response is equal to or larger than some threshold value T; and A far region, in which a measured proximity sensor response is below some threshold value T, and a sensor-surface distance is relatively large.

Again, claimed subject matter is not limited to such a characterization of sensor-surface distance regions. For example, in some instances, instead of characterizing regions in terms of $\{<T \text{ and } \geq T\}$ thresholding logic, as discussed above, $\{|\leq|T \text{ and } >T\}$ logic may be applied without deviating from the scope or spirit of claimed subject matter. In such a case, respective proximity sensor outputs, sensor-surface distance regions, etc. may be re-plotted accordingly.

As may also be observed in an upper plot of FIG. 1D, proximity sensor response curves exhibit a somewhat pronounced asymmetry in slopes of the response peaks with respect to different sensor-surface regions. For example, if a reflective surface is moving relatively smoothly from a far region to a very near region (e.g., via a near region, etc.), a response curve rises relatively gradually, reaches a peak value, and then drops somewhat rapidly towards 0. In this context, a relatively smooth movement may comprise, for example, one or more motions associated with a typical behavior of a user interacting with a mobile device, such as bringing a mobile device to an ear to answer a call, putting a mobile device down after a call, etc. in a normal fashion, such as with little or no sudden "jerking," waving, or like rather unnatural motions. On the other hand, if a reflective surface is moving relatively smoothly from a very near region to a far region (e.g., via a near region, etc.), for example, there is a relatively sharp slope or increase in a response curve, as may also be seen. A slope asymmetry in proximity sensor response curves may, for example, be advantageously utilized, at least in part, to distinguish between a very near region and a far region, as will be described in greater detail below.

As was indicated, for relatively dark or darker surfaces, a threshold logic-based proximity sensor may, for example, have difficulties distinguishing between a very near region and a far region, since both regions may produce the same or similar low sensor output values with respect to a certain distance. Mechanical adjustments to a design of a mobile device, such as relative positioning or alignment of an emitter-received pair within a structure or body of the device, for example, may partially help to mitigate a detection ambiguity via a possible elimination of a very near region. For example, in some instances, a proximity sensor may be mounted or set somewhat deeper into a mechanical structure or body of a mobile device, as one possible approach. As such, a reflecting surface may possibly remain outside of a very near region since an angle of incidence is somewhat shallower, for example, while a target object is still being captured within a cone of visibility of an emitter-received pair. At times, mechanical approaches, however, may not provide a feasible solution in mobile settings or environments, for example, particularly for relatively thinner mobile devices. For example, a relatively small variation in an alignment of an emitter-received pair may produce or otherwise result in a relatively large difference in a sensor response. In some instances, mechanical approaches may, for example, also restrict freedom of design due to, at least in part, manufacturing, spatial, or aesthetic constraints. Accordingly, it may be desirable to develop one or more methods, systems, or apparatuses that may implement effective or efficient proximity sensor distance detection ambiguity removal. As will be seen, in some instances, distance detection ambiguity may include, for example, ambiguity between two sensor-surface range regions producing the same or similar readings.

In an implementation, thresholding logic along with an observed asymmetry in proximity sensor response curves, as discussed above, may be advantageously utilized or otherwise considered, at least in part, to sufficiently differentiate or distinguish, for example, between a very near region and a far region. More specifically, as will be seen, a Low/High indicator may compare a proximity sensor output to some predefined threshold so as to distinguish a near region from other two sensor-surface regions, such as, for example, a very near region or a far region. Thresholding logic may be expressed via a suitable truth function utilizing, for example, a binary valued {true, false} logic defined, at least in part, via a {Low=0/High=1} operator with respect to a certain constant threshold value T, meaning that the Indicator is true if a surface is inside a near region and false, otherwise. Optionally or alternatively, a $T_H$ threshold value with added hysteresis for noise rejection or filtering, for example, may be employed. Thus, one or more true-to-false signal transitions in a Low/High Indicator may be isolated in a suitable manner, such as, for example, via an appropriate transition detector, as will also be seen below.

Continuing with the above discussion, an estimate of a slope of a sensor reading may, for example, be computed as a function of time or sample number, and a suitable spike in a slope estimate may be detected or otherwise identified. As will be seen, a spike may be identified via a Slope Estimate, for example, computed as a function of an analog-to-digital converter (ADC) measurement of received reflected power in units of counts/sample against time. Claimed subject matter is not so limited, of course. Any suitable plot, table, mapping, or like information that may facilitate or support computation of a slope estimate in connection with an asymmetry in a sensor response curves (e.g., slow or gradual versus rapid signal rises or falls, etc.), for example, may be utilized or otherwise considered. In some instances, a rate of change or first order derivative of received reflected power over time may be employed, just to illustrate another possible implementation. A spike may comprise, for example, a relatively narrow, high peak or like excursion that is significantly or otherwise sufficiently above its neighboring peaks, if any. Some examples of a spike as well as a spike detection technique will be described in greater detail below.

According to an implementation, based, at least in part, on an applicable decision-type processing logic, a detected spike and a transition may be temporally correlated in some manner, for example, so as to distinguish between a very near region and a far region. More specifically, a process may, for example, monitor for a certain pair of signaling events occurring in close time proximity. By way of example but not limitation, a pair of signaling events may comprise a negative slope spike in a Slope Estimate, such as due, at least in part, to rapidly decreasing ADC counts, for example, and a true-to-false transition (e.g., 1 to 0, etc.) in a suitable Low/High Indicator, as described in greater detail below. For example, if a negative slope spike substantially correlates or coincides in time with a true-to-false transition in a Low/High Indicator, it may be determined or otherwise inferred that a distance to a reflecting surface has transitioned from a near region to a very near region. If, however, a true-to-false transition does not substantially correlate or coincide in time with a detected negative slope spike, it may be determined or inferred, for example, that a distance to a reflecting surface has transitioned from a near region to a far region. As previously mentioned, this may help to remove or otherwise mitigate a sensor-surface distance detection ambiguity (e.g., "very near" versus "far," etc.) and, as such, may reduce instances of failure to detect proximity to a target object. It should be noted that in some instances a distinction between a very near region and a far region may be made, for example, after a distance to a reflecting surface has passed or transitioned at least once through a near region. Of course, these are merely example details relating to one possible implementation of proximity sensor distance detection ambiguity removal, and claimed subject matter is not so limited.

Figure 2:
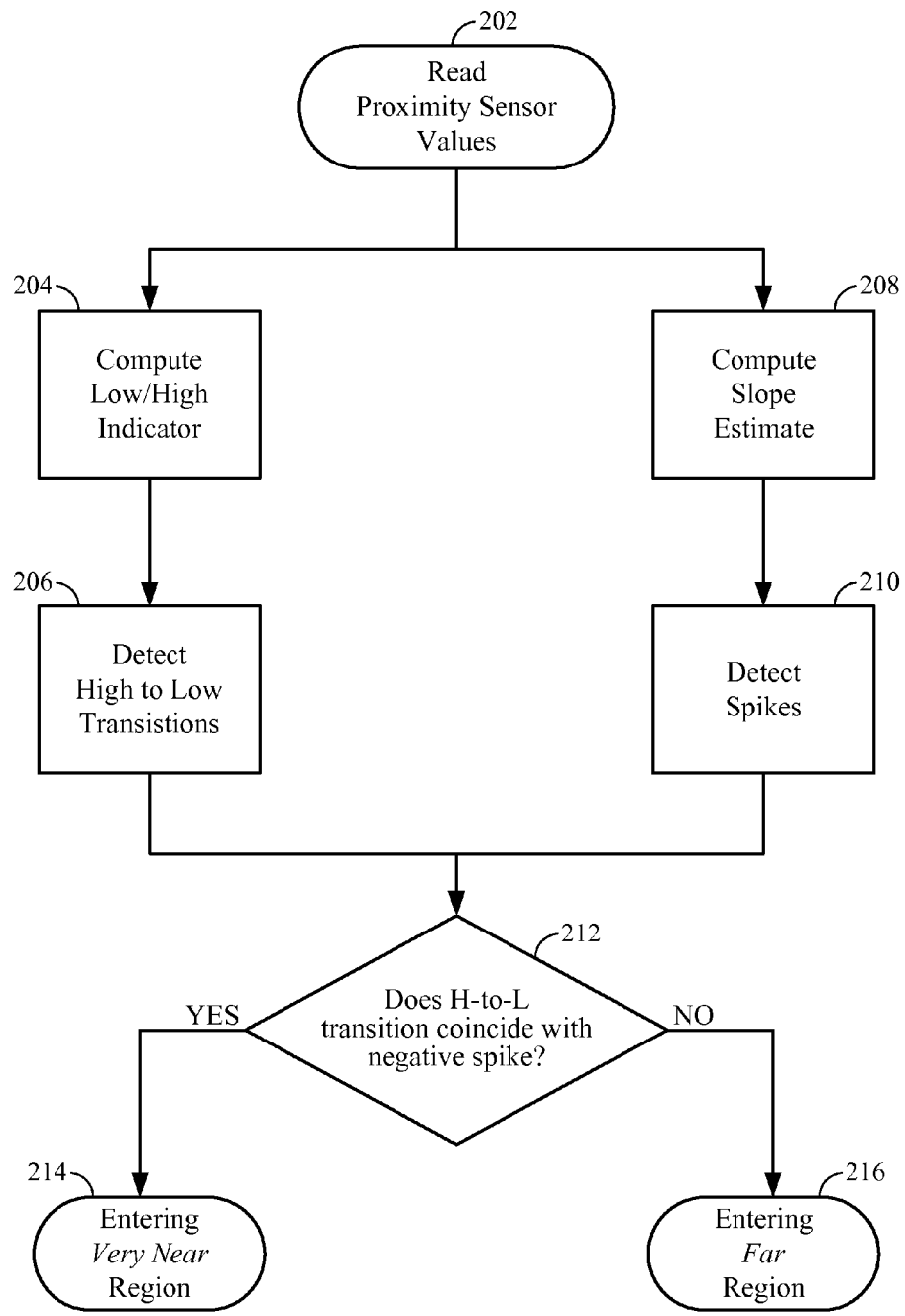
FIG. 2 is a flow diagram illustrating an implementation of an example process for proximity sensor distance detection ambiguity removal.

FIG. 2 is a flow diagram illustrating an implementation of an example process 200 that may be performed, in whole or in part, to remove or otherwise mitigate a proximity sensor distance detection ambiguity. It should be noted that information acquired or produced, such as, for example, input signals, output signals, operations, results, etc. associated with example process 200 may be represented by one or more digital signals. It should also be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

As illustrated, example process 200 may begin at operation 202 with reading in some manner one or more proximity sensor output values. For example, one or more proximity sensor output values may be read via processing one or more digital signals, one sample at a time, using an appropriate signal processing technique so as to facilitate or support a particular task. In one implementation, a task may comprise, for example, determining or assessing whether a high-to-low signal transition substantially correlates or coincides in time with a negative slope spike in a Slope Estimate so as to distinguish between a very near region and a far region. In certain implementations, an output value for a current sample n may be denoted by any suitable notation, such as, for example, by A(n), and a previous value may be denoted by A(n−1), and so forth. It should be noted that like or similar notation or convention may, for example, be used, at least in part, for other quantities that may be computed from A(n) or its recent sampling history. Typically, although not necessarily, a proximity sensor may be sampled at a relatively uniform rate, such as in samples per second, for example, or otherwise sufficiently frequently so as to capture suitable changes in one or more proximity sensor output values while a mobile device is in motion, or while a reflecting surface is moving relative to a stationary mobile device, or both. As the term used herein, a "motion," "movement," or related terms may refer to a physical displacement of a thing (e.g., a mobile device, etc.), for example, relative to one or more points of reference (e.g., target object, etc.). Again, these are merely example details relating to one possible implementation of proximity sensor distance detection ambiguity removal, and claimed subject matter is not limited in these respects.

At operation 204, a Low/High Indicator may, for example, be computed using appropriate techniques. As previously mentioned, a Low/High Indicator may, for example, compare a sensor output value to some constant threshold to determine whether the output value is low or high. It should be noted that a Low/High Indicator may, for example, be conceptually equivalent to a Near Indicator of FIGS. 1B-1D, but may be defined as a function of sample number rather than time and may include hysteresis, as described below. For example, if a sensor output value is sufficiently low (e.g., below a certain pre-defined threshold, etc.), a Low/High Indicator may report "0." Otherwise, such as if a signal output value is sufficiently high (e.g., above a certain pre-defined threshold, etc.), for example, a Low/High Indicator may report "1." As was also indicated and as particularly seen in an upper plot of FIG. 1D, at times, there may be a certain amount of spiking or so-called "jaggedness" in a response curve, which may be representative of "noise" or "fuzz" attributable to a fluctuation in a sensor output signal. Accordingly, in one implementation, a suitable hysteresis-type process may be applied in some manner so as to increase or otherwise improve noise immunity. As used herein, "hysteresis" may refer to a tunable parameter indicative of an amount of signal samples of the same or similar polarity that a process may apply in connection with some threshold prior to changing a particular state. In some instances, hysteresis may be represented, for example, via a constant integer specifying a number of consecutive opposite state sensor output values that may be compared to or matched against a Low/High Indicator threshold T so as to confirm a signal transition (e.g., high-to-low, etc.). In other words, hysteresis may help to sufficiently confirm that a transition to another state has occurred by utilizing, for example, a certain number of signal samples (e.g., consecutive, sequential, etc.) indicative of a change in state. A number of samples may be determined experimentally and pre-defined (e.g., by a user, manufacturer, provider, etc.), for example, or otherwise dynamically defined in some manner, depending on an ambient environment, application, sensor, signal, or the like.

By way of example but not limitation, in certain simulations or experiments, a hysteresis value of three was used, such that three consecutive samples would be compared to or matched against a low/high threshold $T_H$, thus, producing the same LHI value of opposite polarity to the current value, for example, before a Low/High Indicator transition is confirmed. Thus, in an implementation, based, at least in part, on a hysteresis delay H represented, for example, via a relatively small number of samples (e.g., three samples, etc), a hysteresis-type process may be applied at one or more potential state transitions so as to reduce relatively "noisy" rapid Low/High Indicator toggling between 0 and 1 states. More specifically, if a Low/High Indicator begins at 0, for example, H consecutive sensor output values may be above a low/high threshold $T_H$ before the indicator is changed to 1. Similarly, if a Low/High Indicator begins at 1, for example, H consecutive sensor output values may be below $T_H$ before the indicator is changed to 0. It should be appreciated that these are merely examples relating to one particular application of a hysteresis-type process, and claimed subject matter is not so limited. Any other suitable hysteresis-type process that may help to confirm with reasonable certainty that a transition to another state has occurred may be utilized. For example, in some instances, instead of three consecutive signal samples, a certain number of sequential samples, or any three out of four samples, or three out of five, etc. samples may be used or otherwise considered, just to illustrate a few other possible implementations.

Thus, according to an implementation, for a new sensor sample A(n), a Low/High Indicator with added hysteresis, may be computed, for example, as:

$$\begin{cases} \text{If } I(n-1) \text{ is } 0 \text{ and } A(m) \geq T_H \text{ for all} \\ \quad \{m: n-H+1 \leq m \leq n\} \end{cases}, \text{ set } I(n) = 1 \\ \text{If } I(n-1) \text{ is } 1 \text{ and } A(m) < T_H \text{ for all} \\ \quad \{m: n-H+1 \leq m \leq n\} \end{cases}, \text{ set } I(n) = 0 \\ \text{Otherwise}, \quad \text{set } I(n) = I(n-1)$$

where A(n) represents an input signal denoted via a proximity sensor output value for a current sample n; I(n) represents an output signal denoted via an LHI for a current sample number n; $T_H$ denotes a low/high threshold; and H denotes a hysteresis constant integer specifying a number of consecutive opposite state sensor output values that may be used or otherwise considered for a change in an I(n) state. It should be appreciated that in certain implementations a start of a computation of a Low/High Indicator with hysteresis, such as at an initialization stage, for example, may be delayed or otherwise postponed until at least H−1 previous samples of A(n) are available.

At operation 206, one or more true-to-false or high-to-low transitions may, for example, be detected or otherwise identified in some manner. For example, a Low/High Indicator may compare a sensor output value to a low/high threshold $T_H$ with added hysteresis (e.g., LHI hyst=3, etc.), as discussed above, and may determine whether the output value is low or high. If it is sufficiently confirmed, such as via an application of a hysteresis-type process, for example, that an LHI signal that begins at a high value of 1 has changed to a low value of 0, it may be determined or inferred that a high-to-low transition has occurred. In some instances, a process may also denote in some manner a time at which a certain high-to-low transition occurred so as to facilitate or support a temporal correlation of the transition with a negative spike in a slope, as will be described in greater detail below.

With regard to operation 208, a slope may, for example, be estimated or computed in a suitable manner. It should be appreciated that any suitable techniques, such as techniques featuring significant or otherwise sufficient noise immunity, for example, may be utilized. In some instances, a suitable technique may include, for example, monitoring in some manner an amount of net change in a sensor reading (e.g., via a sensor output value, etc.) and determining a number of samples that may be needed or otherwise useful to move or change a signal by a certain amount. By way of example but not limitation, in one particular simulation or experiment it has been observed that the more samples are needed or may be useful, the lower the slope, though claimed subject matter is not so limited. In other words, if a monitored amount of a net change in a sensor output value is above a certain threshold level (e.g., size, magnitude, etc.), the amount may be divided by a number of samples over which such a change occurred, for example, so as to effectively or efficiently compute a slope estimate. As such, a computation may be performed, for example, with respect to a sufficient level of a net change (e.g., since a last slope estimate computation, etc.), for example, rather than on every signal sample. This may eliminate or otherwise reduce low-level signal variations in a proximity sensor output, and, as such, may serve as a form of hysteresis, for example, confirming that a sufficient change in an output value has occurred before performing a slope estimate computation. Accordingly, in an implementation, a suitable hysteresis-type process, such as a hysteresis-type process discussed above, for example, may be applied in connection with a slope estimate computation so as to increase or otherwise improve noise immunity. In some instances, such as if one or more sensor output values do not change, change little, or change relatively slowly, for example, a slope estimate computation may be reset in some manner. For example, as described below, a slope estimate computation may be reset periodically or as some pre-defined time intervals so as to effectively or efficiently detect or identify a sufficient change. Resetting a slope estimate computation may, for example, help to remove or otherwise disregard any undesirable sampled output values while performing a new slope estimate computation, as will also be seen.

As previously mentioned, a slope estimate for an A(n) response curve may, for example, be computed as a function of time or sample number. In an implementation, a slope estimate may, for example, be used, at least in part, to distinguish between a relatively slowly rising and relatively rapidly falling portions of a response curve or between a relatively slowly falling and a relatively rapidly rising portions of a response curve. In some instances, a distinction may be made by identifying or detecting, for example, relatively large or rapid changes in one or more proximity sensor output values. As will be seen, a slope estimate may comprise, for example, a positive slope estimate or a negative slope estimate. A positive slope estimate may be represented via one or more rising sensor output values, for example, and a negative slope estimate may be represented via one or more falling sensor output values. More specifically, in one implementation, a slope estimate may be computed, for example, by dividing a cumulative change in a sensor output value by a number of samples over which the change occurred, or:

$$\text{Slope Estimate} = \text{delta\_}A/\text{delta\_}n,$$

where delta_A denotes a change in a sensor output value, and delta_n denotes a number of associated signal samples. It should be appreciated that delta_n may be incremented in some manner, such as, for example, for one or more signal samples in which a certain (e.g., non-zero, etc.) output value change occurs. To improve or otherwise positively affect noise immunity, computation of a slope estimate may be postponed or delayed until, for example, a large or otherwise sufficient change in a sensor output value has occurred. In some instances, such as if a cumulative sensor value change is not yet large or otherwise sufficient enough, for example, a slope estimate value may be kept or maintained at zero.

As was also indicated, in some instances, a process may, for example, delay or otherwise postpone computing a new slope estimate value. For example, in one implementation, a process may ignore a time period over which a sensor output value is not changing, changing little or relatively slowly, and may begin a new slope estimate computation if a sufficient change in a sensor output value has been detected. This may, for example, help to avoid taking into account too much of a distant sampling past. Here, a suitable directive or construct, such as a "reset counter," for example, may be employed, at least in part, so as to keep track of a duration of one or more relatively low or otherwise less than sufficient activity periods. Accordingly, delta_A or delta_n computations may, for example, be reset, such that a new slope estimate value may be computed if one or more suitable or applicable conditions are satisfied. These one or more conditions may include, for example, computing a new slope value if a new slope estimate value is output or, optionally or alternatively, if a reset counter has reached some pre-defined limit $L_S$. Claimed subject matter is not limited to these particular conditions, of course.

In one particular implementation, a pseudo-code description suitable for computing a slope estimate may include an example illustrated in Table 1 below. It should be appreciated that a pseudo-code description is provided herein by way of non-limiting example to which claimed subject matter is not limited. Here, A(n) represents an input signal denoting a proximity sensor output value for a current sample n, S(n) represents an output signal denoting a slope estimate for a current sample n, $T_S$ denotes a threshold constant specifying or characterizing a degree of slope estimation noise immunity, and $L_S$ denotes a sample count limit characterizing or specifying how long a process may wait before resetting a slope estimate computation. By way of example but not limitation, in certain simulations or experiments, it appeared that a threshold constant $T_S$=50 may, for example, prove beneficial in sufficiently controlling a degree of slope estimation noise immunity. In addition, although claimed subject matter is not limited in this respect, in one particular implementation, some examples of internal variables may include those listed below.

delta_A. A temporary variable denoting a cumulative change in A(n) at a current sample n, for example.

start_A. A state or static variable denoting a sensor value at a start of a current slope computation, for example.

delta_n. A state or static variable denoting a certain count or number of selected samples from a start or beginning of a slope estimate computation, for example. delta_n may be incremented in some manner, such as, for example, for one or more samples in which a non-zero change in A(n) occurs.

rst_cnt. A state or static variable denoting a reset counter, for example.

last_delta_A. A state or static variable denoting a previous value of delta_A at most recent or otherwise sufficient change in A(n), for example.

In addition, a notation "//" may be used, at least in part, to denote, for example, a start of a comment. Thus, consider:

Initialize:
a. Delay the start of the computation until at least one previous sample A(n−1) is available.
b. Set start_A=delta_n=rst_cnt=last_delta_A=0
For Each New Sensor Sample A(n):

TABLE 1

Example pseudo-code description suitable for computing a slope estimate.

```
// compute delta_A, the change in A since the start of this
// computation
delta_A = A(n) − start_A
// update the reset counter rst_cnt during low activity periods;
// otherwise, reset the counter
if delta_A == last_delta_A or delta_A == 0
        rst_cnt = rst_cnt + 1
else
        rst_cnt = 0
endif
// increment delta_n while the reset counter is 0
if rst_cnt == 0
        delta_n = delta_n + 1
        last_delta_A = delta_A
    endif
// compute the slope estimate S(n) from delta_A and delta_n
// provided that delta_A is large enough; otherwise, slope = 0
if abs(delta_A) > T_S and delta_n > 0
        S(n) = delta_A / delta_n
else
        S(n) = 0
endif
    // reset delta_n and last_delta_A if the reset counter goes over the
    limit L_S
    // or a slope estimate value was just computed.
    // Remember the current sample number as last_n.
    if rst_cnt > L_S or abs(delta_A) > T_S
        delta_n = 0
        last_delta_A = 0
        start_A = A(n)
    endif
```

Figure 3A:
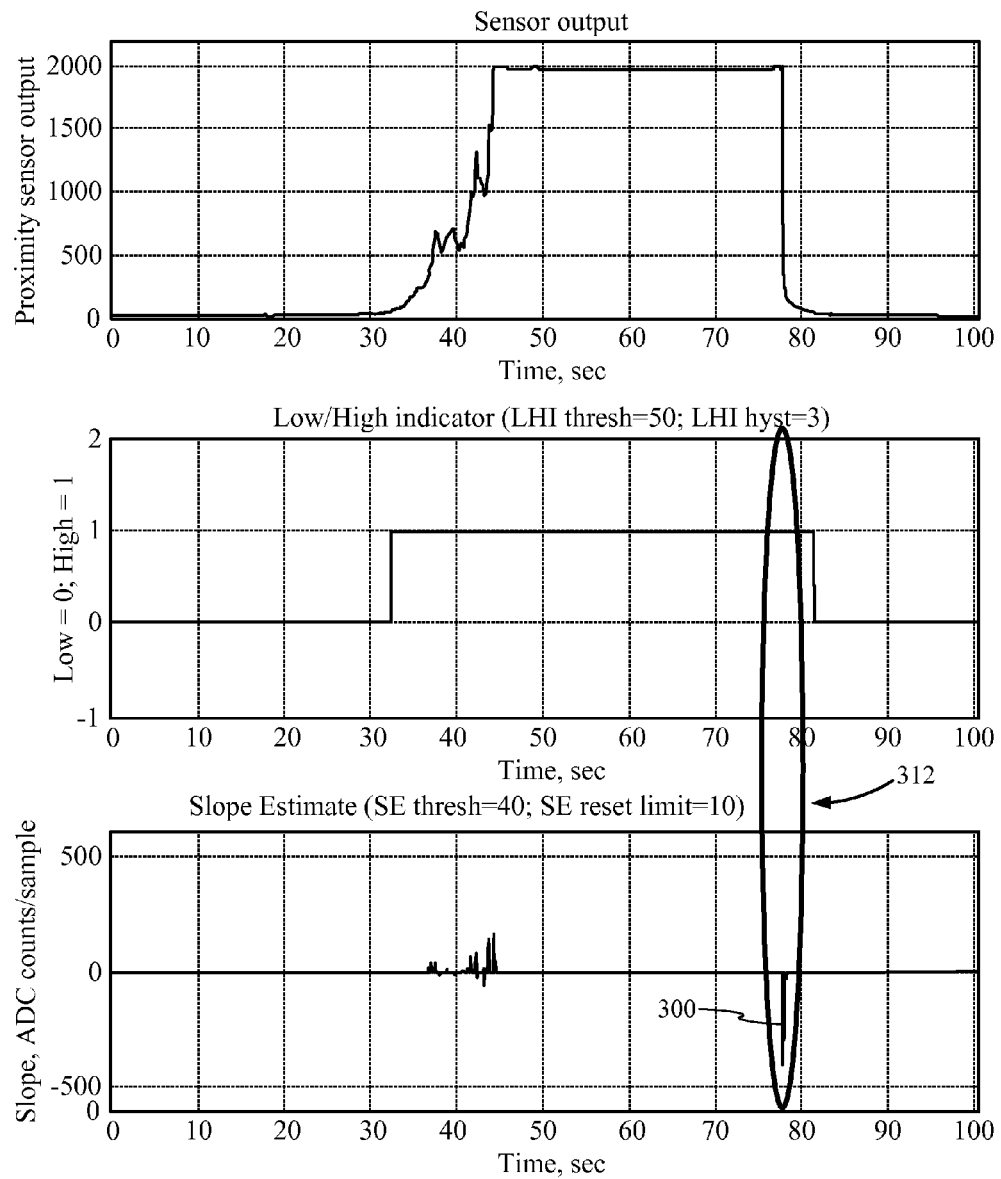
FIGS. 3A through 3C illustrate examples of slope estimates for various reflective surfaces according to an implementation.
Figure 3B:
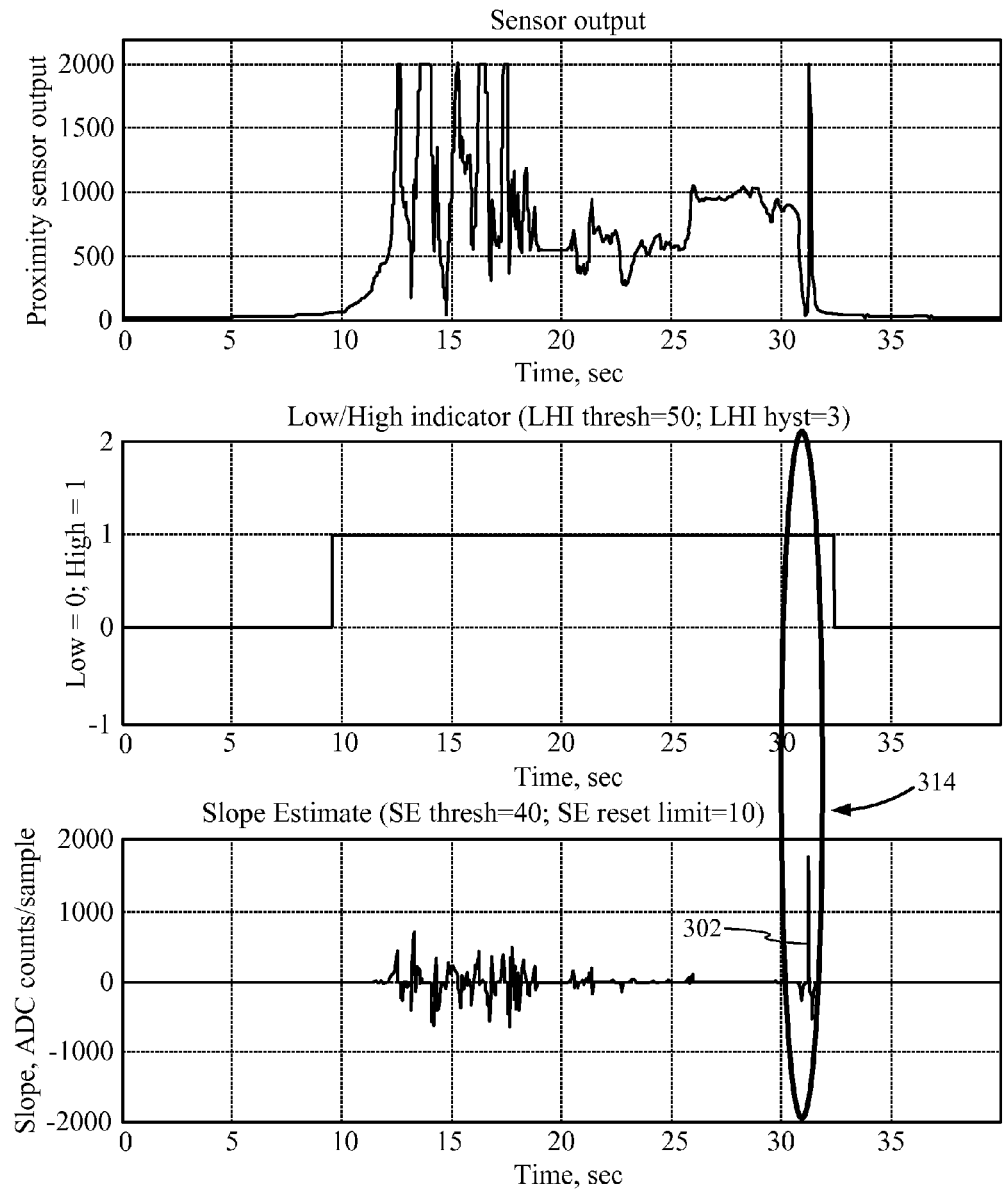
Figure 3C:
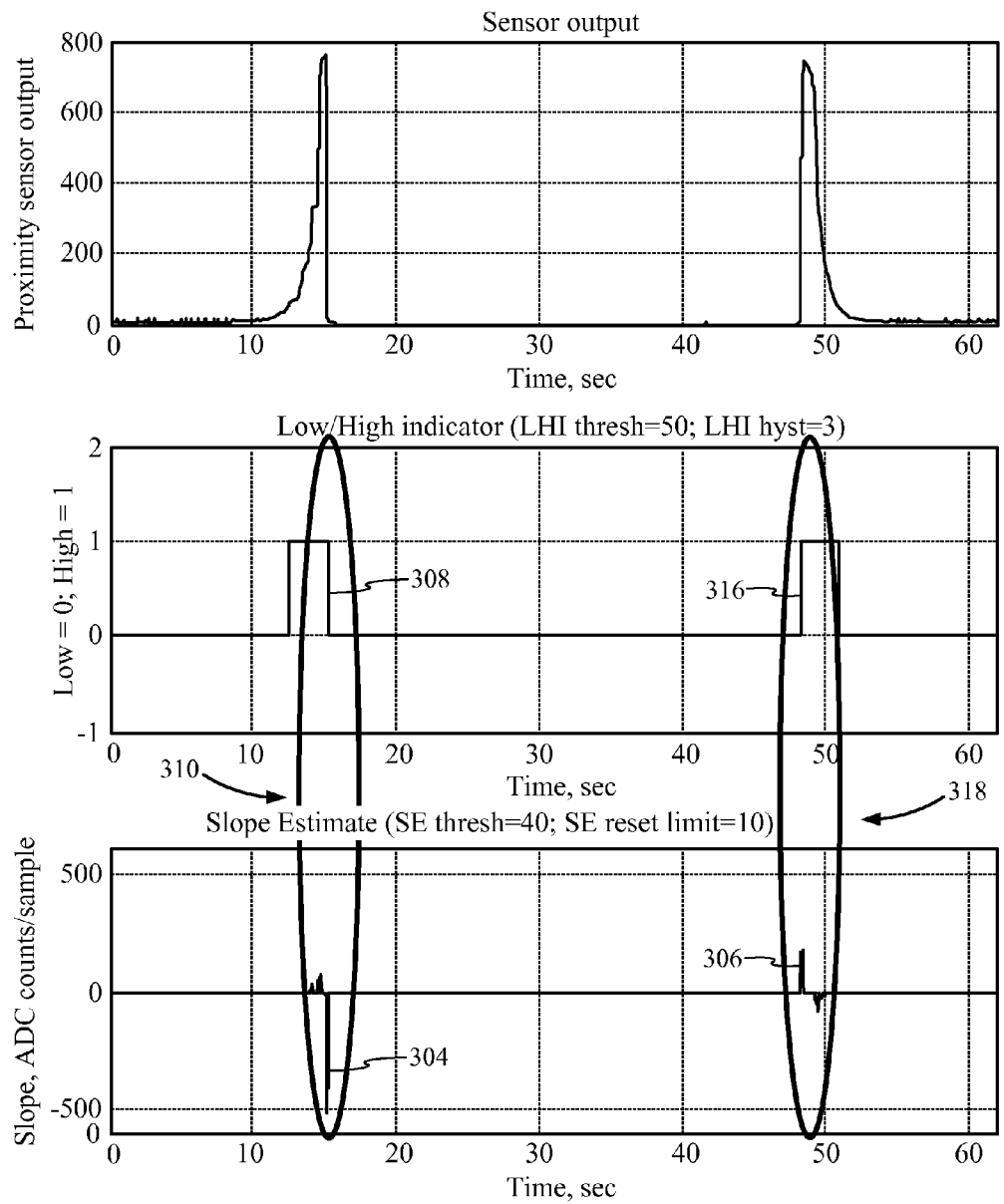

By way of example but not limitation, FIGS. 3A-3C illustrate examples of slope estimates for various reflective surfaces, such as a lighter surface (e.g., white, etc.), somewhat darker surface (e.g., gray, etc.), and relatively dark surface (e.g., black, etc.), respectively, computed in connection with certain simulations or experiments. Again, it should be appreciated that various measurements, tunable parameters, readings, surfaces, etc. shown are merely examples to which claimed subject matter is not limited. Here, respective upper plots illustrate a proximity sensor output A(n) plotted in a fashion similar to example proximity sensor responses discussed above (e.g., in connection with FIGS. 1B-1D, etc.). Respective middle plots comprise an example binary Low/High Indicator I(n), as was also discussed above, computed with an LHI threshold $T_H$=50 and a hysteresis value LHI hyst=3, as one possible example. According to an implementation, respective lower plots illustrate an example slope estimate S(n) computed in connection with an example threshold constant $T_S$=40 and an example reset sample count limit $L_S$=10. Again, it should be noted that claimed subject matter is not limited to thresholds, values, parameters, etc. illustrated herein. Also, while particular details relating to one or more implementations discussed herein are directed to leveraging a slope against time (e.g., if sampling relatively uniformly, etc.), a number of samples may also be used, at least in part (e.g., if not sampling relatively uniformly, etc.). It should be noted that other suitable techniques (e.g., a rate of change or first order derivative over time, etc.) featuring sufficient noise immunity, for example, may be used or otherwise considered without deviating from claimed subject matter.

Referring back to the flow diagram of FIG. 2, at operation 210, a spike may be detected or otherwise identified in some manner. As previously mentioned, a spike may comprise a relatively narrow, high signal peak or like excursion that is significantly larger or otherwise sufficiently above its neighboring peaks. In some instances, a spike may comprise, for example, an excursion that is larger than its neighboring peaks by a factor of two or more, just to illustrate one possible implementation to which claimed subject matter is not limited. As will be seen, a process may detect or identify a spike in a series of slope estimate readings S(n), for example, and may return both a height and a sign of a detected spike in the form of a signed (e.g., positive or negative) spike value. At times, a spike may be identified, for example, via a peak value represented by a height of a single detected peak, which may also be positive or negative. A peak value may comprise any suitable slope value, such as, for example, a slope value with the largest absolute value between two consecutive slope sign reversals, which peak value may or may not comprise a spike. In certain implementations, slope sign reversals may occur every time a sign of a slope estimate S(n) changes, as one possible example. Thus, without loss of generality, a spike value may comprise a peak value with the largest absolute value since a last spike value reset condition. As such, a spike value may, for example, represent a height of the tallest peak in a series of relatively closely spaced peaks. A spike value reset condition may occur after a run or consideration of a certain number of samples, such as, for example, $L_P$ consecutive samples with a zero slope estimate value. As described below, $L_P$ may comprise a tunable parameter represented via some constant denoting a suitable counter limit. A spike value reset operation or condition may, for example, be advantageously implemented or otherwise considered so as to isolate separated groups of peaks.

A pseudo-code description listed in Table 2 below may provide an example description of a particular technique that may be implemented or otherwise considered, in whole or in part, in connection with a process of detecting a spike. It should be appreciated that a pseudo-code description refers to one non-limiting technique within a described implementation, and that many other techniques or implementations for detecting a spike are possible. As such, a technique discussed herein or other possible techniques, including techniques that are in development or to be developed, for example, may be used, at least in part, with implementations other than those discussed herein. For this particular example, S(n) represents an input signal denoting a slope estimate for a current sample n, K(n) represents an output signal denoting a spike value for a current sample n, and $L_P$ is a constant representing a counter limit characterizing or specifying how long a process may wait before resetting a spike value, as previously mentioned. In addition, in one particular simulation or experiment, one or more variables included those listed below, though claimed subject matter is not limited in this respect.

sign_reversal. A temporary internal logical variable. For example, consider sign_reversal=true if a sign reversal has just occurred.

reset_condition. A temporary internal logical variable. For example, consider reset_condition=true if a spike value reset condition has just been detected.

last_slope_sign. A state or static internal variable. For example, consider last_slope_sign=a slope sign observed prior to a current sample, which may exclude zero slope values. A slope sign may, for example, be denoted by +1 for a positive sign, −1 for a negative sign, or 0 for a zero value.

peak_value. A state or static internal variable. For example, consider peak_value=a current peak value, as discussed above.

zero_slope_count. A state or static internal variable. For example, consider zero_slope_count=a current zero slope count to determine one or more spike value reset conditions.

Likewise, here, a notation "//" may be used, at least in part, to denote, for example, a start of a comment. Thus, consider:
Initialize:
   a. Defer the start of the computation until a valid S(n) value is available.
   b. Set the prior value K(n−1)=0.
   c. Set last_slope_sign=peak_value=zero_slope_count=0.
For Each New Slope Value S(n):

TABLE 2

Example pseudo-code description suitable for spike detection.

```
// find slope sign reversals
sign_reversal = false
if S(n) != 0
    if sign(S(n)) != last_slope_sign
        sign_reversal = true
    endif
    last_slope_sign = sign(S(n))
endif
// find the peak value since the last sign reversal
If sign_reversal or K(n−1) == 0 or abs(S(n)) > abs(peak_value)
    peak_value = S(n)
endif
// detect reset condition after L_P zero slope values
if S(n) == 0,
    zero_slope_count = zero_slope_count + 1
else
    zero_slope_count = 0
endif
reset_condition = zero_slope_count > L_P
// keep track of the spike value
If reset_condition
    K(n) = 0
elseif abs(peak_value) > abs(K(n−1))
    K(n) = peak_value
else
    K(n) = K(n−1)
endif
```

By way of example but not limitation, in certain simulations or experiments, one or more spikes detected with respect to various reflective surfaces, such as a lighter surface (e.g., white, etc.), somewhat darker surface (e.g., gray, etc.), and relatively dark surface (e.g., black, etc.), respectively, included those illustrated in FIGS. 3A-3C. As particularly seen in respective lower plots, a spike of interest may be identified in a series of slope estimate readings S(n), for example, and may comprise a negative slope spike, referenced at 300 in FIG. 3A or at 304 in FIG. 3C, or a positive slope spike, referenced at 302 in FIG. 3B or at 306 in FIG. 3C. It should be appreciated that detected spikes, parameters, readings, surfaces, etc. shown as merely examples, and claimed subject matter is not so limited.

With regard to operation 212, it may be determined whether a suitable transition of an LHI correlates or coincides in some manner with a spike of interest. In some instances, a suitable transition of an LHI may comprise, for example, a true-to-false or a high-to-low signal transition, and a spike of interest may comprise, for example, a relatively recent or concurrent negative slope spike. Thus, here, a true-to-false or a high-to-low LHI signal transition may, for example, be temporally correlated with a negative slope spike, just to illustrate one possible implementation. For example, a slope indicator may be referenced or otherwise examined in some manner, such as in a manner discussed above, so as to detect or identify a negative slope spike. As previously mentioned, a spike may comprise, for example, a signal peak with the largest absolute value since a last spike value reset condition. As previously mentioned, to remove or otherwise mitigate a sensor-surface distance ambiguity, a process may, for example, assess or determine whether a trailing or falling (e.g., 1→0, etc.) edge of a Low/High Indicator (e.g., in respective middle plots of FIGS. 3A-3C) substantially correlates or coincides in time with a detected negative slope spike (e.g., in respective lower plots of FIGS. 3A-3C). In other words, if an LHI I(n) is transitioning from 1 to 0, for example, a process may assess or determine whether a "0" state is indicative of a very near region or a far region, as discussed below. For example, if an LHI I(n) trailing or falling edge occurs in sufficiently close temporal proximity to a negative slope spike (e.g., substantially correlates in time, etc.), it may be determined or inferred that a distance to a reflective surface has transitioned to a very near region. Otherwise, such as if an LHI I(n) trailing or falling edge does not substantially correlate or coincide in time with a detected negative slope spike, it may, for example, be determined or inferred that a distance to a reflecting surface has transitioned to a far region.

It should be noted that in some instances, such as if an LHI I(n) is 0 while an applicable process, such as example process 200 or associated computing platform is first initialized, for example, a current sensor-surface region may be unknown. Thus, a distinction between a very near region and a far region may be made, for example, after a distance to a reflecting surface has passed through or transitioned at least once to a near region. In one implementation, an LHI I(n) leading or rising edge may, for example, indicate or suggest that a distance to a reflective surface has transitioned to a near region, as will also be seen. Once transitioned to or passed through a near region, a special purpose computing device or platform associated with a mobile device, for example, may keep track of a current sensor-surface region using one or more appropriate techniques. Of course, these are merely examples relating to temporally correlating a suitable transition and a spike of interest, and claimed subject matter is not so limited.

More specifically, a current sensor-surface region or zone, such as "unknown," "very near," "near," or "far" may, for example, be determined based, at least in part, on one or more sensor ADC values, a Low/High indicator, and a slope spike value, just to illustrate one possible implementation. If a Low/High indicator is 1, for example, a sensor-surface region or zone is "near," as previously mentioned. As illustrated below, a coincidence detector or like process may, for example, compute the largest ADC value seen during this time period. In order to compensate for hysteresis used in computing a Low/High Indicator, for example, the ADC maximum computation may also cover a few ADC values just before a low-to-high or 0→1 transition of the LHI. In the context of the present disclosure, it may be assumed, for example, that reported or otherwise applicable ADC values comprise positive values, though claimed subject matter should not be limited to such an assumption, of course. Continuing with the discussion, if a Low/High indicator is 0, for example, a current zone may be determined just after a 1→0 transition of the LHI, and may stay or otherwise be maintained the same while the LHI remains at 0. As also illustrated below, if a spike value is negative, and if an absolute value of a spike exceeds a threshold computed, for example, as some pre-determined fraction of the maximum ADC value computed over a previous LHI "high" time period or segment (e.g., since a last reset condition, etc.), then a current zone is "very near." Otherwise, a current zone is "far," as previously discussed. This may help to ensure or otherwise confirm that a spike height is large or otherwise sufficient enough in relation to a suitable spike value threshold, such as, for example, a recently observed maximum ADC value. As such, somewhat smaller height spikes may, for example, be advantageously ignored by a correlation or coincidence detector.

By way of example but not limitation, a pseudo-code listing descriptive of or otherwise suitable for a process for signal correlation or coincidence detection may include, at least in part, an example illustrated in Table 3 below. Again, it should be appreciated that a pseudo-code description is provided herein by way of non-limiting example to which claimed subject matter is not limited. Here, one or more input signals may include, for example, A(n) denoting a proximity sensor output value for a current sample n, I(n) denoting a Low/High Indicator for a current sample n, and K(n) denoting a spike value for a current sample n, as described above. In certain implementations, an output signal may be represented via Z(n) denoting a sensor-surface region or zone value for a current sample n and comprising or otherwise be descriptive of, for example, UNKNOWN, VERY_NEAR, NEAR, or FAR region-based values. Also, here, $T_K$ denotes a threshold constant specifying or characterizing a minimum spike height absolute value as $T_K$*<recent maximum ADC value>, and H denotes a tunable hysteresis parameter, as discussed above, for example, in connection with operation 204 of FIG. 2. In addition, in an implementation, one or more variables listed below may also be employed, in whole or in part. Claimed subject matter is not so limited, of course.

adc_val. A temporary internal variable. For example, consider adc_val=current ADC value.

max_adc. A state or static internal variable. For example, consider max_adc=maximum ADC value observed during a time period when I(n) is 1. In some instances, max_adc may include, for example, one or more ADC values prior to a leading or rising (e.g., 0→1, etc.) edge of an LHI I(n) to allow for a hysteresis delay in the LHI I(n).

A notation "//" may be used, at least in part, to denote, for example, a start of a comment, as was also indicated. Thus, consider:

Initialize:
 a. Defer the start of the computation until I(n−1) and K(n) both have valid values.
 b. Initialize the zone Z(n−1) to UNKNOWN at the computation start.
 c. Set max_adc=0

For Each Sample in which A(n), I(n) and K(n) Both have Valid Values:

TABLE 3

Example pseudo-code description suitable for signal correlation.

```
if I(n) == 1
    Z(n) = NEAR
    // Indicator has a 0 to 1 transition
    if I(n-1) == 0
        adc_val = max(<last H ADC values>)
    else
        adc_val = A(n)
    endif
    if adc_val > max_adc
        max_adc = adc_val
    endif
else
    if I(n-1) == 1
        // Indicator I has a 1 to 0 transition
        if sign(K(n)) < 0 and abs(K(n)) > T_K * max_adc
            Z(n) = VERY_NEAR
        else
```

TABLE 3-continued

Example pseudo-code description suitable for signal correlation.

```
            Z(n) = FAR
        endif
    else
        Z(n) = Z(n-1)
    endif
    max_adc = 0
endif
```

Accordingly, if a suitable signal transition, such as a high-to-low transition substantially correlates or coincides in time with a spike of interest, such as a negative slope spike, for example, it may be determined or inferred that a distance to a reflecting surface has transitioned to or entered a very near region, as indicated generally at operation 214. An example of a high-to-low transition that correlates or coincides in close proximity in time with a negative slope spike with sufficient height, for example, detected in connection with one particular simulation or experiment may be observed on the left circled portion of FIG. 3C. As illustrated, here, it appears that an LHI I(n) trailing or falling edge, indicated at 308, occurred sufficiently close to the same time as a negative slope spike of sufficient height, referenced by 304, meaning that a current sensor-surface region is "very near." Thus, by way of example but not limitation, a substantial correlation or coincidence occurrence or event pair is referenced in FIG. 3C by an arrow at 310, though claimed subject matter is not limited in this regard.

Referring back to FIG. 2, on the other hand, if an LHI I(n) trailing or falling edge does not substantially correlate or coincide with a detected negative slope spike of sufficient height, example process 200 may, for example, determine or infer that a distance to a reflecting surface has transitioned to or entered a far region, as indicated generally at operation 216. This may be observed, for example, in a circled portion of FIG. 3A, as referenced generally by an arrow 312, and in a circled portion of FIG. 3B, as referenced generally by an arrow at 314. As previously mentioned, in an implementation, a near region may comprise, for example, a sensor-surface region or zone in which a measured proximity sensor response is larger than some pre-defined threshold value $T_H$. Accordingly, an LHI I(n) leading or rising edge, referenced at 316 in FIG. 3C, for example, may indicate that a distance to a reflective surface has transitioned to a near region. It should be appreciated that, at times, a transition to a near region may substantially correlate or coincide with a certain slope spike, such as a positive spike, for example, as illustrated by an arrow at 318. It should also be noted that in some instances, such as if the LHI=1 condition is used to detect a near region, for example, one or more slope spikes near a transition to a near region may be ignored. In addition, for this example condition, one or more slope spikes occurring while LHI=1 in a near region, for example, may also be ignored. Of course, particular details relating to a process of distinguishing between sensor-surface regions or zones are merely examples, and claimed subject matter is not so limited.

It should be appreciated that claimed subject matter is not limited to one particular approach with respect to a determination of whether a spike occurred in a sufficiently recent past so as to ignore or disregard a relatively old spike, as previously mentioned, and that various approaches consistent with the scope or spirit of claimed subject matter may be employed. For example, process 200 may perform a time correlation aspect or logic (e.g., coincidence-in-time decision, etc.) at operation 210 in connection with spike detection, at operation 212 in connection with coincidence detection, or any combination thereof. To illustrate, in one particular implementation, a spike value may, for example, be reset to zero during periods of little or no change in a slope in connection with spike detection (e.g., at operation 210, etc.), as seen in Table 2. A coincidence detector may, thus, assume, for example, that a reported spike comprises a recent spike for the purpose of making a coincidence decision (e.g., at operation 212, etc.). In such a case, a coincidence detector may, for example, check if a spike value is negative and if a spike height (e.g., absolute value, etc.) is large or otherwise sufficient enough, as discussed above, without looking at whether a spike occurred in a sufficiently recent past. In other words, a spike may, for example, be erased or otherwise discarded in some manner (e.g., at operation 210, etc.) after some period of inactivity so as not to be seen by a coincidence detector (e.g., at operation 212, etc.). Again, this in merely one possible example of a time correlation aspect or logic relating to a particular implementation, and claimed subject matter is not limited in scope in this respect.

Figure 4:
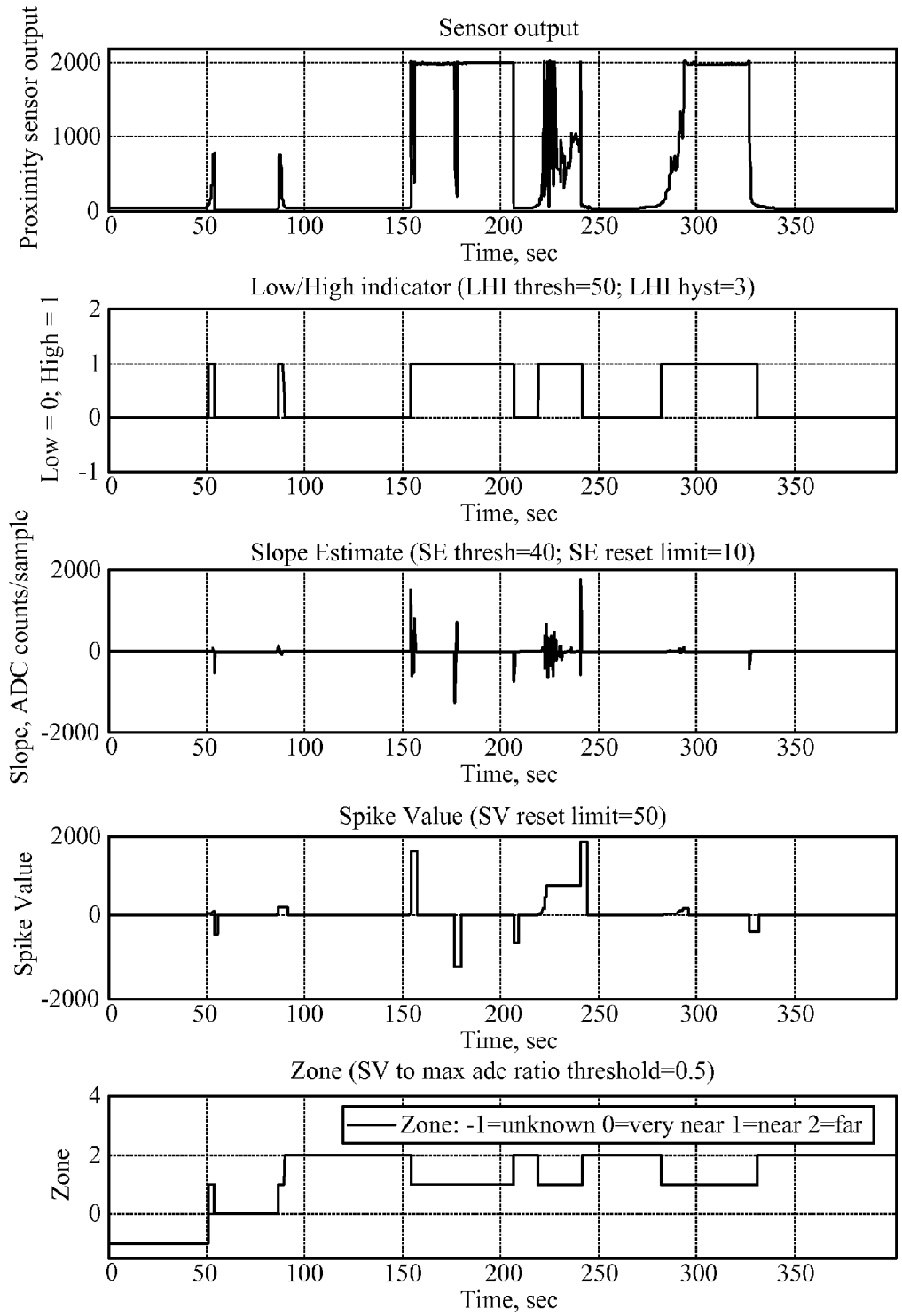
FIG. 4 illustrates examples of selected indicator values.

By way of example but not limitation, some examples of one or more selected variable values generated or otherwise obtained in connection with certain simulations or experiments are illustrated in FIG. 4. Here, values are shown, for example, as a collection of readings obtained in connection with a continual sensor motion or path (e.g., by a user, via a mobile device, etc.) relative to various reflecting surfaces, as discussed above, for a relatively longer time series of proximity sensor values. It should be appreciated that various measurements, parameters, readings, values, plots, etc. shown as merely examples to which claimed subject matter is not limited. More specifically, for this example, selected variables illustrate particular values corresponding to a certain stage of an applicable computation performed, for example, on a particular dataset in response to a pseudo-code description, as listed above, as one possible implementation. Accordingly, from an upper to a lower plot, respectively, illustrated selected indicator values comprise, for example:

Proximity sensor output values A(n).
Low/high indicator values I(n).
Slope estimate values S(n).
Spike values K(n).
Sensor-surface region or zone values Z(n).

Figure 5:
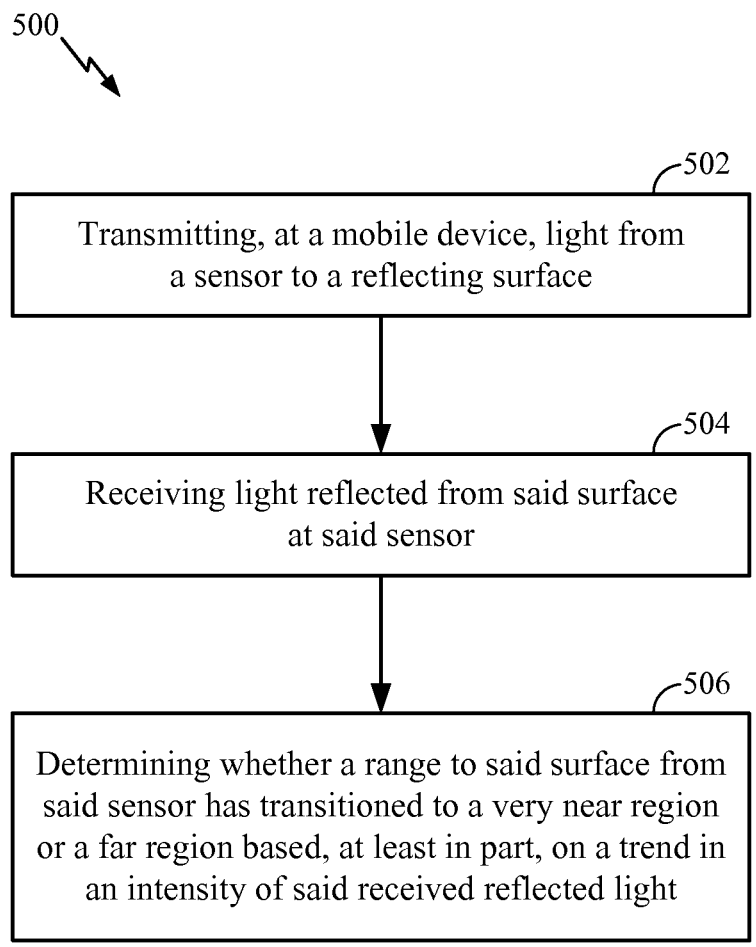
FIG. 5 is a flow diagram illustrating another implementation of an example process for proximity sensor distance detection ambiguity removal.

FIG. 5 is a flow diagram illustrating an implementation of an example process 500 that may be performed, in whole or in part, to remove or otherwise mitigate a sensor-surface distance detection ambiguity. Again, it should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 500 may begin at operation 502, for example, with transmitting, at a mobile device, light from a sensor to a reflecting surface. For example, light may be transmitted from a suitable proximity sensor disposed in a mobile device. In some instances, a proximity sensor may be realized, for example, as an IR emitter-receiver pair co-located or placed sufficiently closely on a mobile device, as previously mentioned. Thus, in an implementation, an IR transmitter, such as an LED may, for example, transmit a beam of IR light towards a reflective surface of a target object, though claimed subject matter is not so limited. At operation 504, IR light reflected or scattered from a reflective surface of a target object may be received at a proximity sensor, such as, for example, via an IR receiver. In some instances, reflected or scattered light may be converted into current or digitized in some manner to allow for a measurement activity, such as, for example, for measuring intensity or power of reflected or scattered light.

With regard to operation 506, it may, for example, be determined whether a distance to a reflective surface from a proximity sensor has transitioned to a very near region or a far region based, at least in part, on a trend in an intensity of received reflected or scattered light. For example, here, a Low/High Indicator with added hysteresis may be computed so as to isolate one or more binary or bi-level signal transitions (e.g., low-to-high or high-to-low transitions) using one or more suitable techniques, such as a technique discussed above. As previously mentioned, to determine whether a sensor output value is low or high, a Low/High Indicator may, for example, compare the value to some constant pre-defined threshold. In addition, an estimate of a slope of a sensor reading may, for example, be computed as a function of time or sample number, and a suitable spike in a slope estimate may be detected or otherwise identified. In some instances, a spike may be detected or identified via a Slope Estimate, for example, plotted as a function of a sensor output of received reflected power against time.

As was also indicated, a process may, for example, monitor for a certain pair of signaling events occurring in sufficiently close time proximity. By way of example but not limitation, a pair of signaling events may comprise, for example, a negative slope spike in a Slope Estimate and a high-to-low transition in a Low/High Indicator. For example, if a negative slope spike substantially correlates or coincides in time with a true-to-false transition in a Low/High Indicator, it may be determined or otherwise inferred that a distance to a reflecting surface has transitioned from a near region to a very near region. If, however, a true-to-false transition does not substantially correlate or coincide in time with a detected negative slope spike, it may be determined or inferred, for example, that a distance to a reflecting surface has transitioned from a near region to a far region. This may help to remove or otherwise mitigate a sensor-surface distance ambiguity and, as such, may reduce instances of failed proximity detections, as mentioned above.

Figure 6:
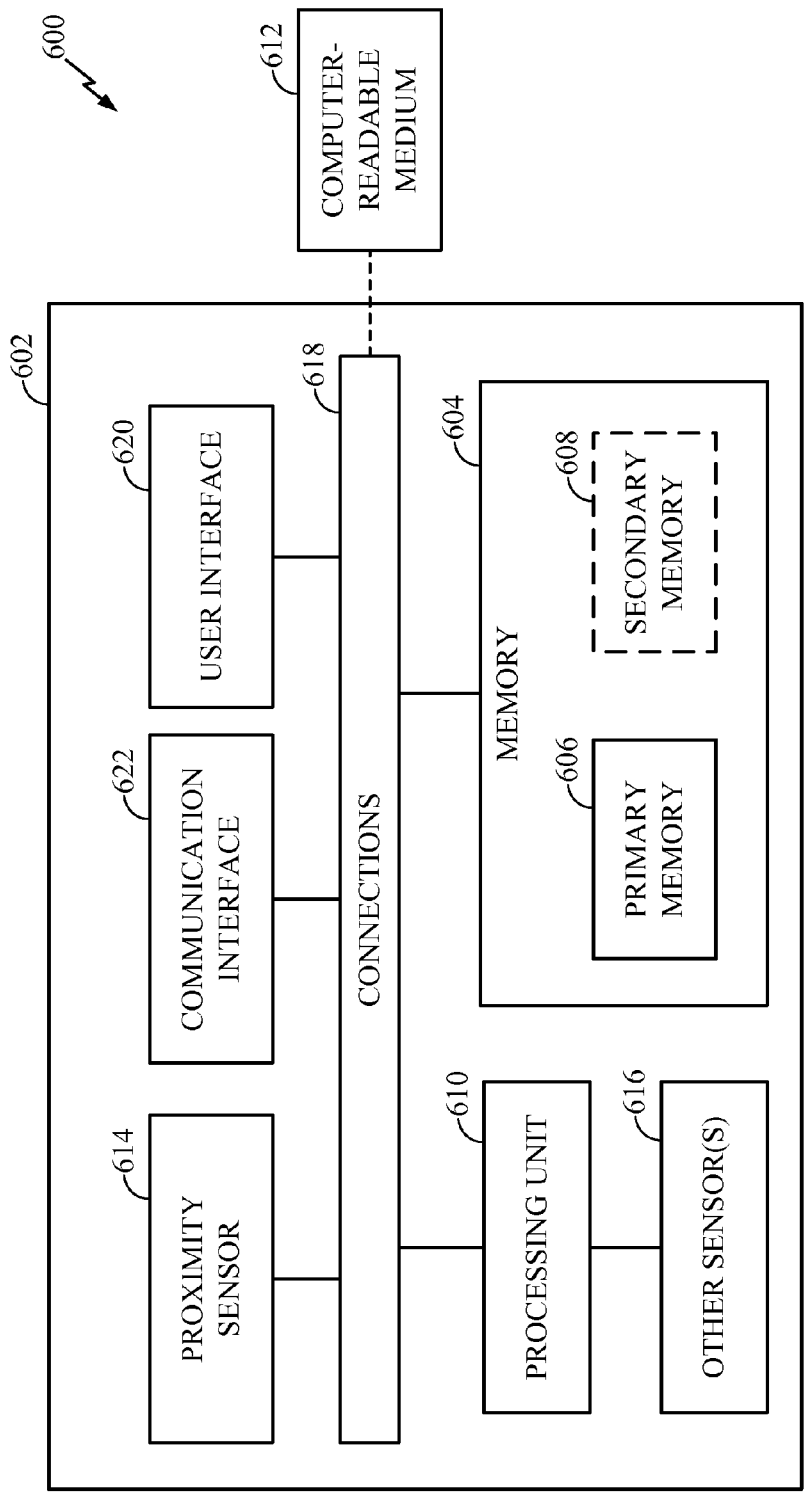
FIG. 6 is a schematic diagram illustrating an example computing environment associated with a mobile device according to an implementation.

FIG. 6 is a schematic diagram illustrating an implementation of an example computing environment 600 that may include one or more networks or devices capable of partially or substantially implementing or supporting one or more processes or operations for proximity sensor distance detection ambiguity removal. It should be appreciated that all or part of various devices or networks shown in computing environment 600, processes, or methods, as described herein, may be implemented using various hardware, firmware, or any combination thereof along with software.

Computing environment 600 may include, for example, a mobile device 602, which may be communicatively coupled to any number of other devices, mobile or otherwise, via a suitable communications network, such as a cellular telephone network, the Internet, mobile ad-hoc network, wireless sensor network, or the like. In an implementation, mobile device 602 may be representative of any electronic device, appliance, or machine that may be capable of exchanging information over any suitable communications network. For example, mobile device 602 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 602 may take the form of one or more integrated circuits, circuit boards, or the like that may be operatively enabled for use in another device.

Although not shown, optionally or alternatively, there may be additional devices, mobile or otherwise, communicatively coupled to mobile device 602 to facilitate or otherwise support one or more processes associated with computing environment 600. Thus, unless stated otherwise, to simplify discussion, various functionalities, elements, components, etc. are described below with reference to mobile device 602 may also be applicable to other devices not shown so as to support one or more processes associated with example computing environment 600.

Although not shown, in certain implementations, computing environment 600 may include, for example, various computing or communication resources capable of providing position or location information with regard to a mobile device 602 based, at least in part, on one or more wireless signals associated with a positioning system, location-based service, or the like. For example, mobile device 602 may include a location-aware or tracking unit capable of acquiring or providing all or part of orientation, position information (e.g., via trilateration, heat map signature matching, etc.), etc. Such information may be provided in support of one or more processes in response to user instructions, motion-controlled or otherwise, which may be stored in memory 604, for example, along with other suitable or desired information, such as one or more threshold values, state or temporary variables, tunable parameters, constants, or the like.

Memory 604 may represent any suitable or desired information storage medium. For example, memory 604 may include a primary memory 606 and a secondary memory 608. Primary memory 606 may include, for example, a random access memory, read only memory, etc. While illustrated in this example as being separate from a processing unit 610, it should be appreciated that all or part of primary memory 606 may be provided within or otherwise co-located/coupled with processing unit 610. Secondary memory 608 may include, for example, the same or similar type of memory as primary memory or one or more information storage devices or systems, such as, for example, a disk drive, an optical disc drive, a tape drive, a solid state memory drive, etc. In certain implementations, secondary memory 608 may be operatively receptive of, or otherwise enabled to be coupled to, a computer-readable medium 612.

It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Computer-readable medium 612 may include, for example, any medium capable of storing or providing access to information, code or instructions (e.g., an article of manufacture, etc.) for one or more devices associated with operating environment 600. For example, computer-readable medium 612 may be provided or accessed by processing unit 610. As such, in certain example implementations, methods or apparatuses may take the form, in whole or part, of a computer-readable medium that may include computer-implementable instructions stored thereon, which, if executed by at least one processing unit or other like circuitry, may enable processing unit 610 or the other like circuitry to perform all or portions of proximity sensor-based or sensor-supported measurements, or any like Processes helpful in removing or otherwise mitigating distance detection ambiguity. In certain example implementations, processing unit 610 may be capable of performing or supporting other functions, such as communications, gaming, or the like.

Processing unit 610 may be implemented in hardware or a combination of hardware and software. Processing unit 610 may be representative of one or more circuits capable of performing at least a portion of information computing technique or process. By way of example but not limitation, processing unit 610 may include one or more processors, controllers, microprocessors, microcontrollers, application specific integrated circuits, digital signal processors, programmable logic devices, field programmable gate arrays, or the like, or any combination thereof.

Mobile device 602 may include various components or circuitry, such as, for example, one or more proximity sensors 614; or various other sensor(s) 616, such as an accelerometer, a magnetic compass, a gyroscope, a video sensor, ambient light detector, etc. that may facilitate or otherwise support one or more processes associated with operating environment 600. For example, such sensors may provide analog or digital signals to processing unit 610. Although not shown, it should be noted that mobile device 602 may include an analog-to-digital converter (ADC) for digitizing analog signals from one or more sensors. Optionally or alternatively, such sensors may include a designated (e.g., an internal, etc.) ADC(s) to digitize respective signals, although claimed subject matter is not so limited.

Although not shown, mobile device 602 may also include a memory or information buffer to collect suitable or desired information, such as, for example, proximity sensor measurement information, as previously mentioned. Mobile device 602 may also include a power source, for example, to provide power to some or all of the components or circuitry of mobile device 602. A power source may be a portable power source, such as a battery, for example, or may comprise a fixed power source, such as an outlet (e.g. in a house, electric charging station, car, etc.). It should be appreciated that a power source may be integrated into (e.g., built-in, etc.) or otherwise supported by (e.g., stand-alone, etc.) mobile device 602.

Mobile device 602 may include one or more connections 618 (e.g., buses, lines, conductors, optic fibers, etc.) to operatively couple various circuits together, and a user interface 620 (e.g., display, touch screen, keypad, buttons, knobs, microphone, speaker, trackball, data port, etc.) to receive user input, facilitate or support sensor-related signal measurements, or provide information to a user. Mobile device 602 may further include a communication interface 622 (e.g., wireless transmitter or receiver, modem, antenna, etc.) to allow for communication with one or more other devices or systems over one or more suitable communications networks, as was indicated.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
    transmitting, at a mobile device, light from a sensor to a reflecting surface;
    receiving light reflected from said surface at said sensor;
    determining that a distance to said surface from said sensor has transitioned to a very near region or a far region based, at least in part, on a transition between high and low values of an intensity of said received reflected light; and
    determining which of said very near region or said far region the distance to said surface from said sensor has transitioned to based, at least in part, on a trend, in addition to the transition between high and low values, in said intensity of said received reflected light.

2. The method of claim 1, wherein said determining which of said very near region or said far region the distance to said surface from said sensor has transitioned to, further comprises:
    measuring said intensity of said received reflected light;
    estimating a slope representative of a rate of change in said measured intensity over time;
    detecting a negative slope spike in said estimated slope; and
    temporally correlating said detected negative slope spike with said transition between high and low values of said received reflected light.

3. The method of claim 2, wherein said slope is estimated, at least in part, in connection with an application of a hysteresis-type process.

4. The method of claim 2, wherein said temporally correlating said detected negative slope spike with said transition between said high and low values of said received reflected light further comprises:
    generating a bi-level signal indicative of whether said received reflected light is below or exceeds a threshold value; and
    determining that said distance has transitioned to said very near region or said far region if an edge of said bi-level signal substantially correlates with said detected negative slope spike.

5. The method of claim 4, and further comprising determining that said distance has transitioned to said very near region if a falling edge of said bi-level signal substantially correlates in time with said detected negative slope spike.

6. The method of claim 4, and further comprising determining that said distance has transitioned to said far region if a falling edge of said bi-level signal does not substantially correlate in time with said detected negative slope spike.

7. The method of claim 4, wherein said distance has transitioned to said very near region or said far region from a near region.

8. The method of claim 4, wherein said bi-level signal is generated, at least in part, in connection with an application of a hysteresis-type process.

9. The method of claim 1, wherein said sensor comprises an ambient environment sensor associated with said mobile device.

10. The method of claim 9, wherein said ambient environment sensor comprises an infrared proximity sensor disposed in said mobile device.

11. The method of claim 1, wherein said that said distance to said surface from said sensor has transitioned to said very near region or said far region is performed while transitioning from a near region.

12. The method of claim 1, wherein said determining that said distance to said surface from said sensor has transitioned to said very near region or said far region is performed after said distance to said surface has transitioned at least once through a near region.

13. An apparatus comprising:
    a mobile device comprising a sensor to:
        transmit light from said sensor to a reflecting surface; and
        receive light reflected from said surface at said sensor;
    and a processor to:
        determine that a distance to said surface from said sensor has transitioned to a very near region or a far region based, at least in part, on a transition between high and low values of an intensity of said received reflected light; and determine which of said very near region or said far region the distance to said surface from said sensor has transitioned to based, at least in part, on a trend, in addition to the transition between high and low, in the intensity of said received reflected light.

14. The apparatus of claim 13, wherein said processor to said determine which of said very near region or said far region the distance to said surface from said sensor has transitioned to, further to:

measure said intensity of said received reflected light;

estimate a slope representative of a rate of change in said measured intensity over time;

detect a negative slope spike in said estimated slope; and temporally correlate said detected negative slope spike with said transition between high and low values of said received reflected light.

15. The apparatus of claim 14, wherein said slope is estimated, at least in part, in connection with an application of a hysteresis-type process.

16. The apparatus of claim 14, wherein said processor to said temporally correlate said detected negative slope spike with said transition between said high and low values of said received reflected light further to:

generate a bi-level signal indicative of whether said received reflected light is below or exceeds a threshold value; and determine that said distance has transitioned to said very near region or said far region if an edge of said bi-level signal substantially correlates with said detected negative slope spike.

17. The apparatus of claim 16, wherein said processor further to determine that said distance has transitioned to said very near region if a falling edge of said bi-level signal substantially correlates in time with said detected negative slope spike.

18. The apparatus of claim 16, wherein said processor further to determine that said distance has transitioned to said far region if a falling edge of said bi-level signal does not substantially correlate in time with said detected negative slope spike.

19. The apparatus of claim 16, wherein said distance has transitioned to said very near region or said far region from a near region.

20. The apparatus of claim 13, wherein said sensor comprises an infrared proximity sensor disposed in said mobile device.

21. The apparatus of claim 13, wherein said processor to said determine that said distance to said surface from said sensor has transitioned to said very near region or said far region is to said determine after said distance to said surface has transitioned at least once through a near region.

22. An apparatus comprising:

means for transmitting, at a mobile device, light from a sensor to a reflecting surface;

means for receiving light reflected from said surface at said sensor;

means for determining that a distance to said surface from said sensor has transitioned to a very near region or a far region based, at least in part, on a transition from high and low values of an intensity of said received reflected light; and means for determining which of said very near region or said far region the distance to said surface from said sensor has transitioned to based, at least in part, on a trend, in addition to the transition between high and low values, in the intensity of said received reflected light.

23. The apparatus of claim 22, wherein said means for determining which of said very near region or said far region further comprises:

means for measuring said intensity of said received reflected light;

means for estimating a slope representative of a rate of change in said measured intensity over time;

means for detecting a negative slope spike in said estimated slope; and means for temporally correlating said detected negative slope spike with said transition between high and low values of said received reflected light.

24. The apparatus of claim 23, wherein said means for temporally correlating said detected negative slope spike with said transition between said high and low values of said received reflected light further comprises:

means for generating a bi-level signal indicative of whether said received reflected light is below or exceeds a threshold value; and means for determining that said distance has transitioned to said very near region or said far region if an edge of said bi-level signal substantially correlates with said detected negative slope spike.

25. The apparatus of claim 24, and further comprising means for determining that said distance has transitioned to said very near region if a falling edge of said bi-level signal substantially correlates in time with said detected negative slope spike.

26. The apparatus of claim 24, and further comprising means for determining that said distance has transitioned to said far region if a falling edge of said bi-level signal does not substantially correlate in time with said detected negative slope spike.

27. The apparatus of claim 24, wherein said distance has transitioned to said very near region or said far region from a near region.

28. The apparatus of claim 24, wherein said bi-level signal is generated, at least in part, in connection with an application of a hysteresis-type process.

29. The apparatus of claim 22, wherein said sensor comprises an ambient environment sensor associated with said mobile device.

30. The apparatus of claim 29, wherein said ambient environment sensor comprises an infrared proximity sensor disposed in said mobile device.

31. An article comprising:

a non-transitory storage medium having instructions stored thereon executable by a special purpose computing platform at a mobile device to:

obtain at least one signal value representative of an intensity of light reflected from a reflecting surface to a sensor;

determine determining that a distance to said surface from said sensor has transitioned to a very near region or a far region based, at least in part, on a transition between high and low values of said intensity of said reflected light; and determine which of said very near region or said far region the distance to said surface from said sensor has transitioned to based, at least in part, on a trend, in addition to the transition between high and low values, in said intensity of said reflected light.

32. The article of claim 31, wherein said instructions to determine which of said very near region or said far region further the distance to said surface from said sensor has transitioned to, comprise instructions to:
- measure said intensity of said reflected light;
- estimate a slope representative of a rate of change in said measured intensity over time;
- detect a negative slope spike in said estimated slope; and
- temporally correlate said detected negative slope spike with said transition between high and low values of said reflected light.

33. The article of claim 32, wherein said instructions to temporally correlate said detected negative slope spike with said transition between said high and low values of said reflected light further comprise instructions to:
- generate a bi-level signal indicative of whether said reflected light is below or exceeds a threshold value; and
- determine that said distance has transitioned to said very near region or said far region if an edge of said bi-level signal substantially correlates with said detected negative slope spike.

34. The article of claim 33, wherein said storage medium further comprises instructions to determine that said distance has transitioned to said very near region if a falling edge of said bi-level signal substantially correlates in time with said detected negative slope spike.

35. The article of claim 33, wherein said storage medium further comprises instructions to determine that said distance has transitioned to said far region if a falling edge of said bi-level signal does not substantially correlate in time with said detected negative slope spike.

36. The article of claim 33, wherein said distance has transitioned to said very near region or said far region from a near region.

37. The article of claim 31, wherein said sensor comprises an infrared proximity sensor disposed in said mobile device.

38. The article of claim 31, wherein said instructions to said determine that said distance to said surface from said sensor has transitioned to said very near region or said far region further comprise instructions to said determine after said distance to said surface has transitioned at least once through a near region.

* * * * *